United States Patent
Chen et al.

(10) Patent No.: US 11,674,232 B2
(45) Date of Patent: Jun. 13, 2023

(54) CATALYSIS OF HYDROGEN EVOLUTION REACTION USING RUTHENIUM ION COMPLEXED CARBON NITRIDE MATERIALS

(71) Applicant: The Regents of the University of California, Oakland, CA (US)

(72) Inventors: Shaowei Chen, Santa Cruz, CA (US); Yi Peng, Santa Cruz, CA (US); Bingzhang Lu, Santa Cruz, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 17/655,943

(22) Filed: Mar. 22, 2022

(65) Prior Publication Data
US 2022/0364249 A1 Nov. 17, 2022

Related U.S. Application Data

(62) Division of application No. 16/652,550, filed as application No. PCT/US2018/054148 on Oct. 3, 2018, now Pat. No. 11,352,704.

(60) Provisional application No. 62/568,549, filed on Oct. 5, 2017.

(51) Int. Cl.
| | |
|---|---|
| H01M 4/02 | (2006.01) |
| C25B 11/073 | (2021.01) |
| C25B 1/04 | (2021.01) |
| C01B 32/184 | (2017.01) |

(52) U.S. Cl.
CPC .......... *C25B 11/073* (2021.01); *C01B 32/184* (2017.08); *C25B 1/04* (2013.01)

(58) Field of Classification Search
CPC ....................................................... H01M 4/02
See application file for complete search history.

(56) References Cited

FOREIGN PATENT DOCUMENTS
KR         101640545 B1         7/2016

OTHER PUBLICATIONS

Peng et al. "Hydrogen evolution reaction catalyzed by ruthenium ion-complexed graphitic carbon nitride nanosheets" J. Mater. Chem. A. 2017, Iss. 34, pp. 18261-18269.*
Zhang, H. et al., "Graphitic carbon nitride nanosheets doped graphene oxide for electrochemical simultaneous determination of ascorbic acid, dopamine and uric acid," Electrochimica Acta, vol. 142, Oct. 1, 2014, 7 pages.
Andrijanto, E. et al., "Facile synthesis of graphene from graphite using ascorbic acid as reducing agent," American Institute of Physics Conference Proceedings, vol. 1725, No. 1, Apr. 2016, 5 pages.

(Continued)

Primary Examiner — Jacob B Marks
(74) Attorney, Agent, or Firm — McCoy Russell LLP

(57) ABSTRACT

A method can include incorporating graphene oxide (GO) in a solution, reducing the graphene oxide (GO) by refluxing carbon nitride ($C_3N_4$) in the solution to form carbon-nitride refluxed-graphene-oxide ($C_3N_4$-rGO) composites, and incorporating ruthenium ions into the $C_3N_4$-rGO composites to form $C_3N_4$-rGO-Ru complexes.

10 Claims, 27 Drawing Sheets
(27 of 27 Drawing Sheet(s) Filed in Color)

(56) References Cited

OTHER PUBLICATIONS

Li, J. et al., "Coupled molybdenum carbide and reduced graphene oxide electrocatalysts for efficient hydrogen evolution," Nature Communications, vol. 7, No. 11204, Apr. 1, 2016, 8 pages.

Peng, Y. et al., "Hydrogen evolution reaction catalyzed by ruthenium ion-complexed graphitic-like carbon nitride nanosheets," Journal of Materials Chemistry A, Aug. 2, 2017, 10 pages.

ISA United States Patent and Trademark Office, International Search Report Issued in Application No. PCT/US2018/054148, dated Dec. 14, 2018, WIPO, 5 pages.

ISA United States Patent and Trademark Office, Written Opinion of the International Searching Authority Issued in Application No. PCT/US2018/054148, dated Dec. 14, 2018, WIPO, 4 pages.

\* cited by examiner

Fig. 1A          Fig. 1B
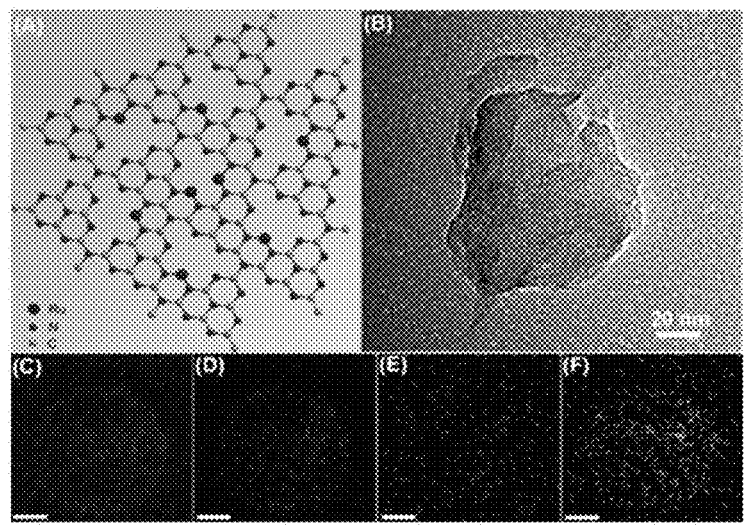
Fig. 1C     Fig. 1D     Fig. 1E     Fig. 1F
FIGURE 1H
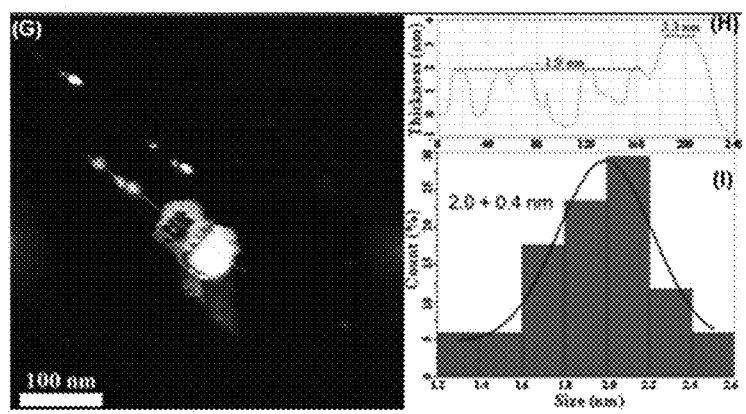
Fig. 1G          Fig. 1I Fig. 2A
Fig. 2B
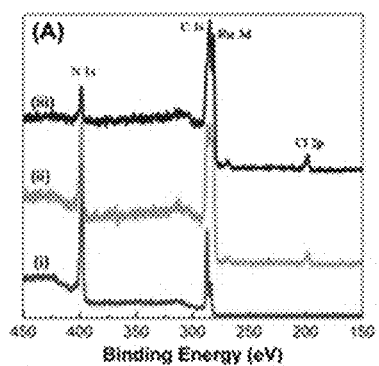
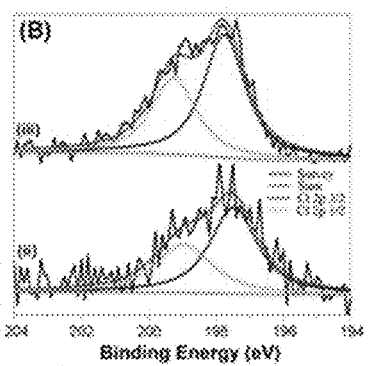
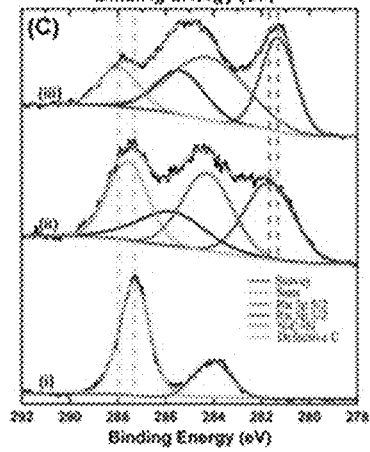
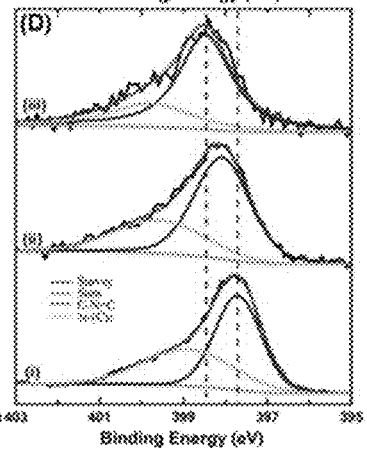
Fig. 2C
Fig. 2D Fig. 5A    Fig. 5B    Fig. 5C    Fig. 5D
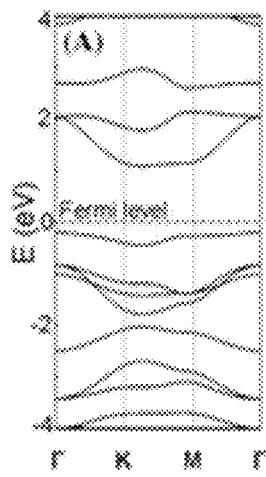 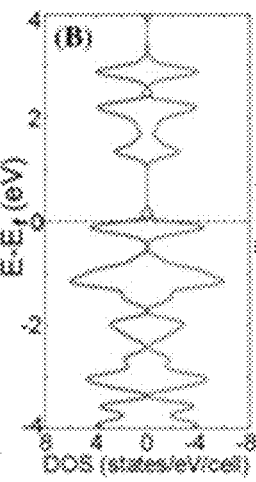 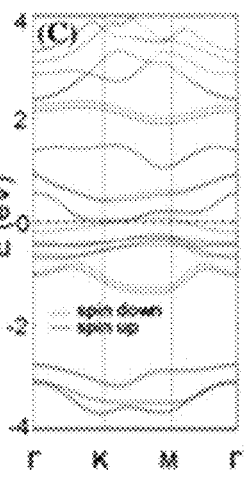 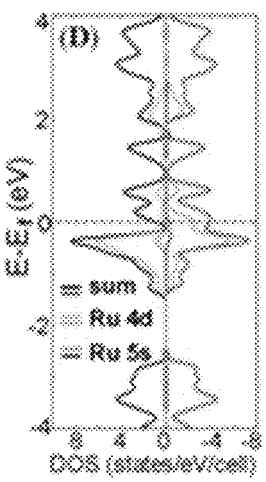
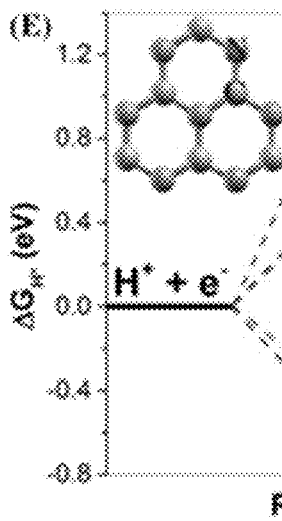 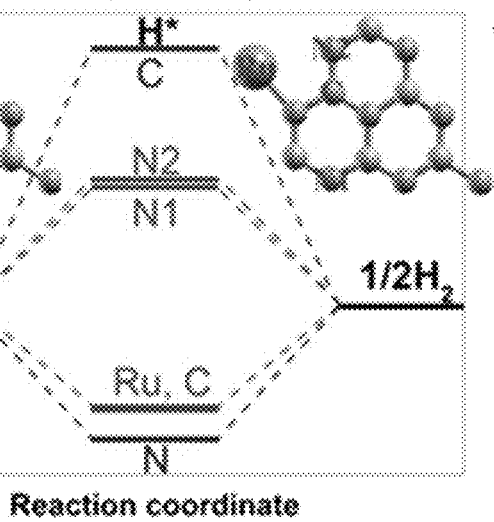 
FIG. 5E    Fig. 5F Fig. 11A
Fig. 11B
Fig. 11C
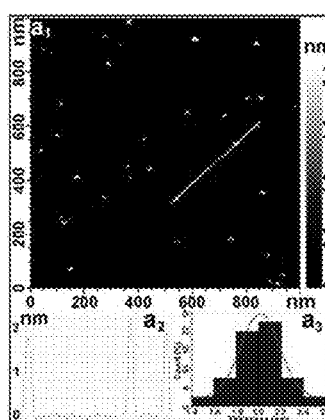
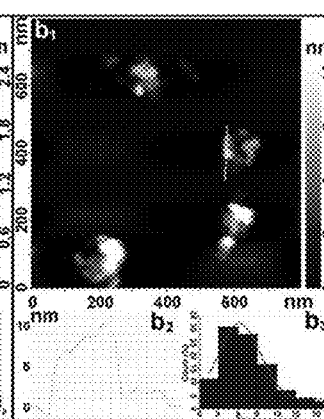
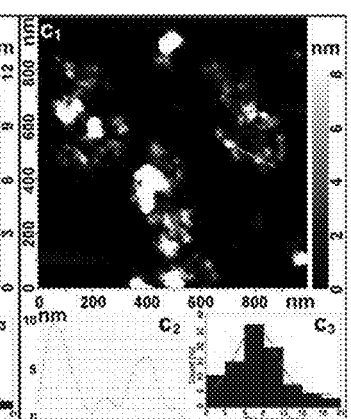
Fig. 11D
Fig. 11E
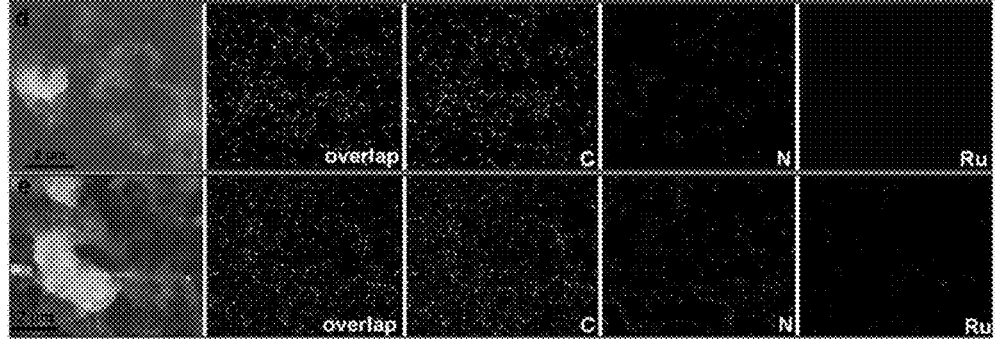

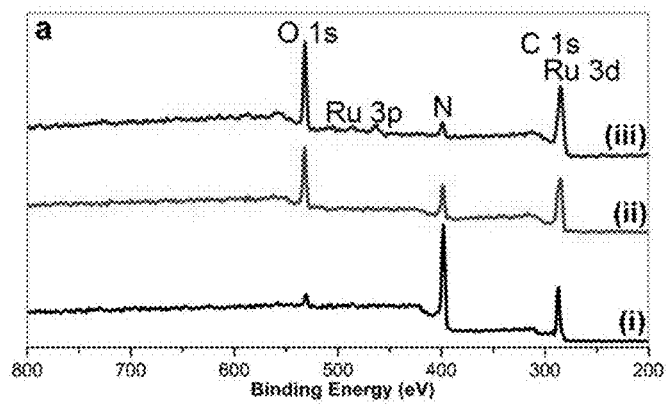
Fig. 12A
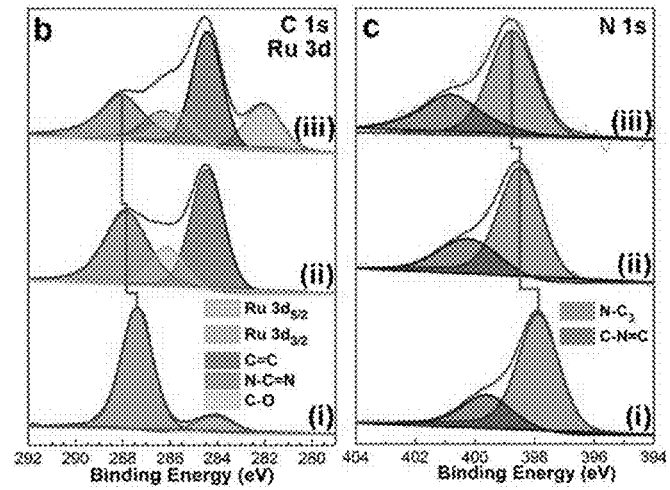
Fig. 12B   Fig. 12C

Fig. 20A
Fig. 20B
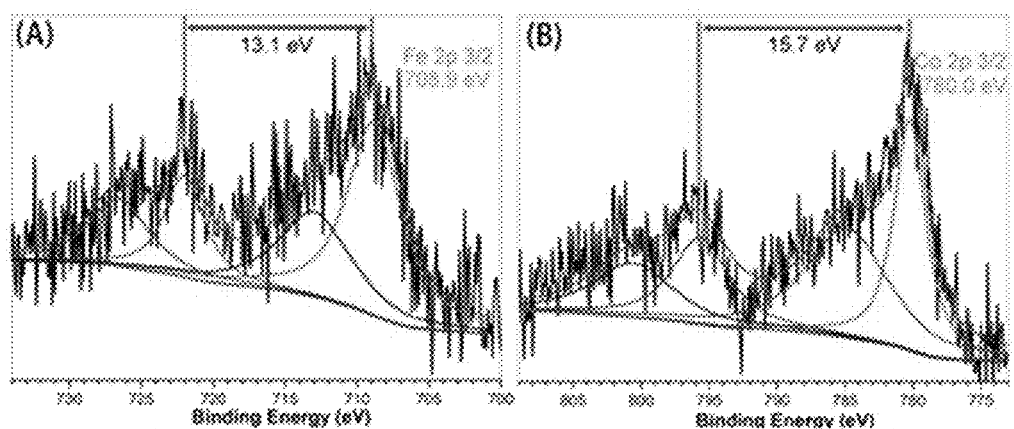
Fig. 20C
Fig. 20D
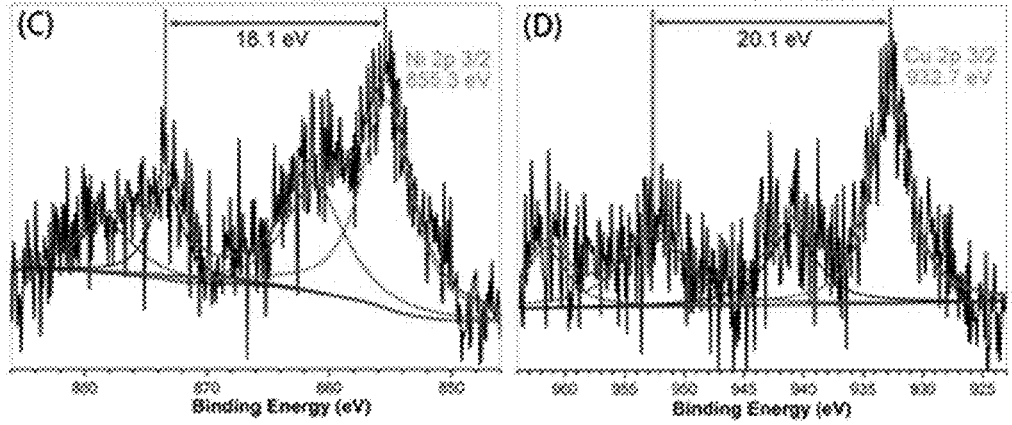

Fig. 22A
(A)
Fig. 22B
(B)
Fig. 22C
(C)
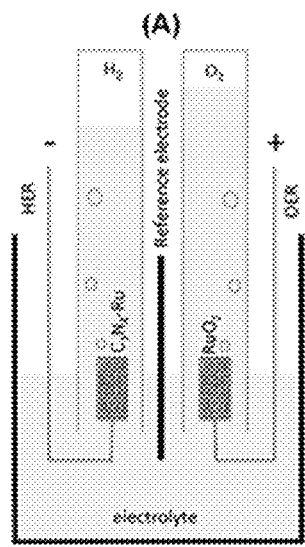
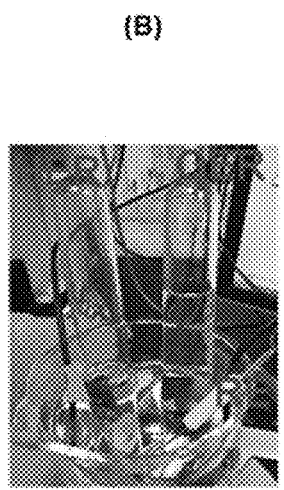
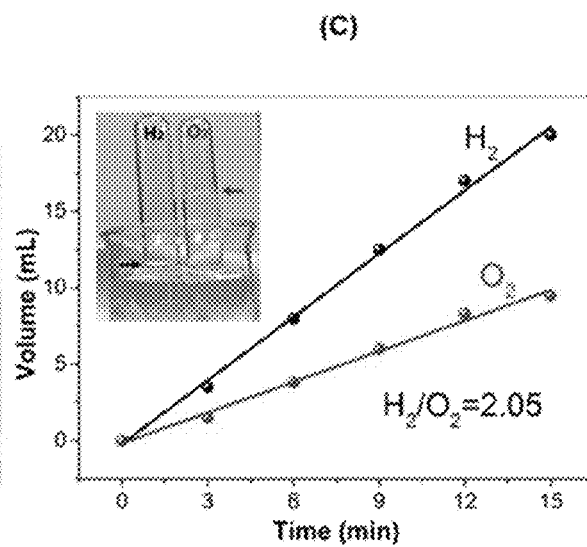

Fig. 25A
Fig. 25B
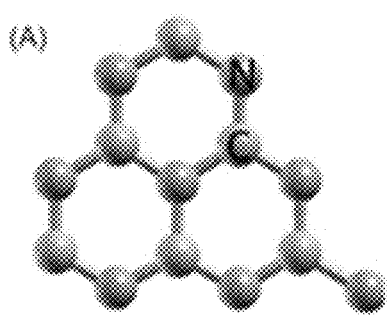
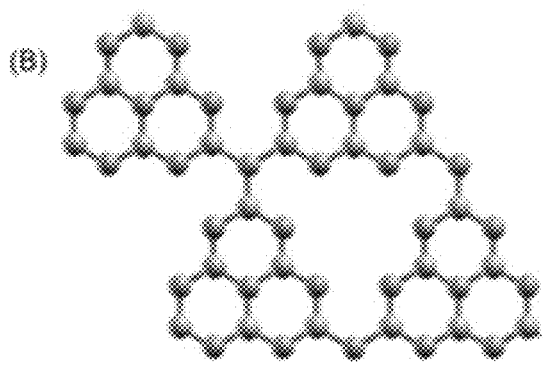
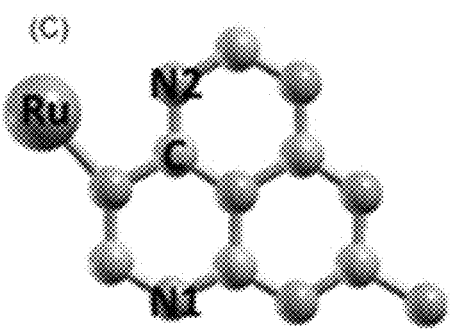
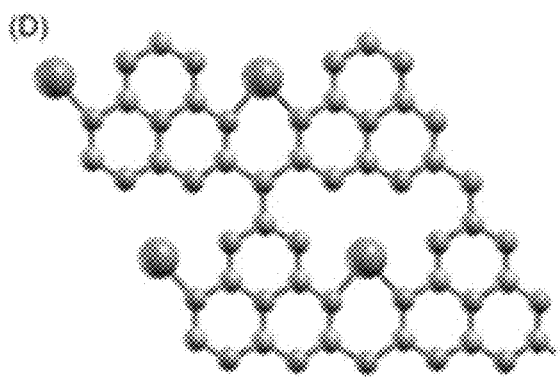
Fig. 25C
Fig. 25D

Fig. 26A
Fig. 26B
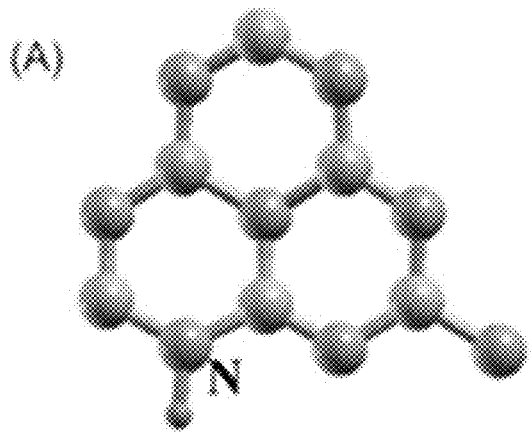
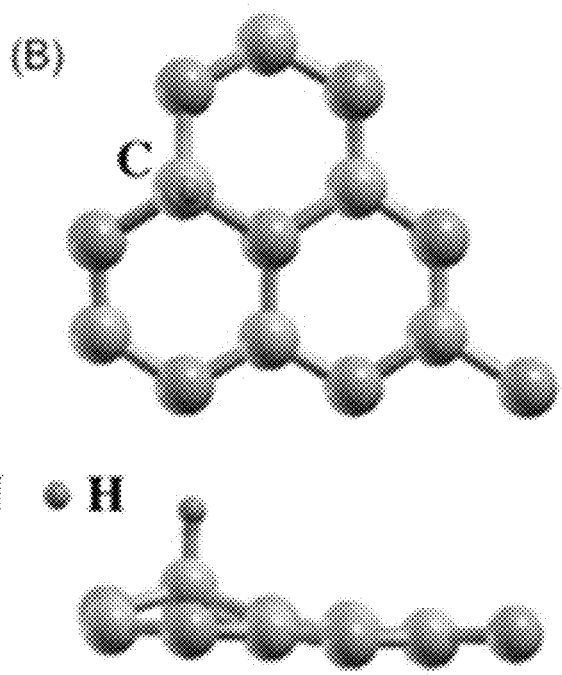

CATALYSIS OF HYDROGEN EVOLUTION REACTION USING RUTHENIUM ION COMPLEXED CARBON NITRIDE MATERIALS

CROSS-REFERENCE TO RELATED APPLICATIONS

This application is a divisional of U.S. application Ser. No. 16/652,550, entitled "Catalysis of the Hydrogen Evolution Reaction Using Ruthenium Ion Complexed," and filed on Mar. 31, 2020. application Ser. No. 16/652,550 is a U.S. national phase filing of PCT/US2018/054148, filed Oct. 3, 2018, which claims priority to and the benefit of U.S. Provisional Patent Application No. 62/568,549, filed Oct. 5, 2017. The entire contents of the above-listed applications are hereby incorporated by reference for all purposes.

TECHNICAL FIELD

The disclosed technology relates generally to hydrogen evolution reaction (HER), and more particularly to the use of carbon nitride and ruthenium in performing hydrogen evolution reaction.

BACKGROUND

As used herein, the term hydrogen evolution reaction (HER) generally refers to a method for generating hydrogen gas from water. Present approaches to catalyzing this reaction involve the use of high amounts of metallic platinum (Pt). However, platinum is expensive and corrodes easily in acid solutions, which are typically preferred solutions in which to perform the hydrogen evolution reaction. Carbon-based and carbon-nitrogen-based catalysts have been created and may be more stable than platinum but neither of them release hydrogen as efficiently as platinum.

HER generally involves multiple electron-transfer processes and requires appropriate catalysts to achieve a fast hydrogen evolution rate. While carbon-supported Pt has been historically recognized as a leading catalyst for HER because of a high exchange-current density and small Tafel slope, the significant costs of Pt have severely hampered wide-spread applications. Thus, development of non-platinum HER catalysts as cost-effective alternatives has been attracting a great deal of attention. For example, transition metal sulfides, nitrides, phosphides, carbides and oxides (e.g., MX, with M=Mo, Fe, Co, Ni, etc.) have been found to exhibit apparent activity toward HER. However, because of low dispersibility in water, the catalytic activity is limited by the accessibility of the active centers. In addition, the durability may be compromised due to structural instability of the catalysts at low pH, which is a typical condition for HER.

In contrast, for homogeneous catalysts based on organometallic complexes, such as cobalt macrocyclic glyoxime and tetraimine complexes, cobalt and nickel diimine-dioxime complexes, copper phthalocyanine complexes, and ruthenium complexes, surface accessibility is markedly enhanced. In these catalysts, the metal centers are coordinated to nitrogen-containing organic ligands, and the resulting M-$N_x$ moieties are generally believed to serve as the active sites for HER catalysis. Yet, despite much progress, the HER performance has remained largely subpar as compared to that of state-of-the art platinum catalysts.

Thus, there remains a need for cost-effective, high-performance electrocatalysts for hydrogen evolution reaction.

SUMMARY

Certain implementations of the disclosed technology generally include the incorporation of ruthenium (Ru) ion, which is advantageously more effective at catalyzing HER than other transition metal ions including iron, cobalt, nickel and copper, into a carbon nitride nanosheet, and subsequent incorporation of graphene oxide into the nanosheet. The resulting composite may catalyze HER about 30% as efficiently as a platinum catalyst but uses a much smaller amount of metal (e.g., 1.9%) and, therefore, is significantly less costly.

In certain embodiments, ruthenium ions may be embedded into the molecular skeletons of graphitic carbon nitride ($C_3N_4$) nanosheets of 2.0±0.4 nm in thickness by refluxing $C_3N_4$ and $RuCl_3$ in water, which takes advantage of the strong affinity of ruthenium ions to pyridinic nitrogen of the tri-s-triazine units of $C_3N_4$. The formation of $C_3N_4$—Ru nanocomposites can be confirmed in optical and X-ray photoelectron spectroscopic measurements, which suggests charge transfer from the $C_3N_4$ scaffold to the ruthenium centers. Significantly, the hybrid materials may be readily dispersible in water, exhibit apparent electrocatalytic activity towards HER in acid and the activity increases with the loading of ruthenium metal centers in the $C_3N_4$ matrix. In certain embodiments, saturating the sample with ruthenium ion complexation at the atomic ratio of ruthenium to pyridinic nitrogen of ca. 1:2 displays an optimal performance, with an overpotential of only 140 mV to achieve the current density of 10 mA/$cm^2$, a low Tafel slope of 57 mV/dec, and a large exchange current density of 0.072 mA/$cm^2$. The activity is markedly lower when $C_3N_4$ is embedded with other metal ions such as $Fe^{3+}$, $Co^{3+}$, $Ni^{3+}$, and $Cu^{2+}$, which suggests a minimal contribution from the $C_3N_4$ nanosheets to the HER activity. The HER activity is most likely due to the formation of Ru—N moieties where the synergistic interactions between the carbon nitride and ruthenium metal centers facilitated the adsorption of hydrogen.

Carbon-based materials are promising electrocatalysts toward hydrogen evolution reaction (HER) due to their low costs; yet the catalytic performance needs to be further improved before commercialization. In certain embodiments, reduced graphene oxide is incorporated into a ruthenium ion-complexed carbon nitride sheet forming $C_3N_4$-rGO-Ru composites through Ru—(N=C)$_2$ coordination at a low Ru loading. The incorporation of both Ru ions and rGO into the composite generally leads to an electron redistribution of the materials, which may significantly enhance the HER performance as compared to other carbon-based HER electrocatalysts, with an overpotential of −80 mV for a 10 mA/$cm^2$ current density, Tafel slope 55 mV/dec, exchange current density 0.462 mA/$cm^2$, for example. This may be ascribed to the positive shift of the conduction band of the composite where the charge carrier density increased markedly by more than 200 times as compared to that of $C_3N_4$, leading to a lower energy barrier of hydrogen evolution and enhanced reaction kinetics.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1A illustrates an exemplary schematic structure of $C_3N_4$—Ru nanosheets.

FIG. 1B illustrates a representative TEM image of $C_3N_4$—Ru—F.

FIGS. 1C, 1D, 1E, and 1F respectively illustrate EDX images of carbon (C), nitrogen (N), ruthenium (Ru), and chlorine (Cl). in $C_3N_4$—Ru—F (scale bars all 50 nm).

FIG. 1G illustrates a representative AFM topograph of $C_3N_4$—Ru—F (scale bar 200 nm).

FIG. 1H illustrates an exemplary height profile of the line scan in FIG. 1G.

FIG. 1I illustrates an exemplary histogram of the thickness of $C_3N_4$—Ru—F nanosheets based on the AFM topographic measurements.

FIG. 2A illustrates an exemplary XPS survey spectra of (i) $C_3N_4$, (ii) $C_3N_4$—Ru—P, (iii) $C_3N_4$—Ru—F.

FIG. 2B illustrates an exemplary high-resolution XPS spectra of Cl 2p electrons.

FIG. 2C illustrates an exemplary high-resolution XPS spectra of C is and Ru 3d electrons.

FIG. 2D illustrates an exemplary high-resolution XPS spectra of N is electrons.

FIG. 5A illustrates exemplary band structures of $C_3N_4$.

FIG. 5B illustrates exemplary projected density of states of $C_3N_4$.

FIG. 5C illustrates exemplary band structures of $C_3N_4$—Ru.

FIG. 5D illustrates exemplary projected density of states of $C_3N_4$—Ru, where contributions of Ru 4d and 5s orbitals to the PDOS are labeled in different colors.

FIG. 5E illustrates an example of calculated Gibbs free-energy (AGO) of HER at the equilibrium potential for $C_3N_4$ (blue) and $C_3N_4$—Ru (red) at various bonding sites as labeled in the panel inset.

FIG. 5F illustrates an exemplary schematic of interfacial charge transfer in $C_3N_4$—Ru, where red signals represent positive charge and blue signals represent negative charge with an isosurface value of 0.003 e/au³ in accordance with certain implementations of the disclosed technology.

FIGS. 11A, 11B, and 11C illustrate representative AFM topographes of ($a_1$) $C_3N_4$, ($b_1$) $C_3N_4$-rGO composites and ($c_1$) $C_3N_4$-rGO-Ru complex, and the corresponding height profiles ($a_2$, $b_2$, and $c_2$) of the lines scans, and thickness histograms ($a_3$, $b_3$, and $c_3$) of the thickness.

FIGS. 11D and 11E respectively illustrate exemplary scanning TEM images and the corresponding elemental maps of carbon, nitrogen and ruthenium of (d) $C_3N_4$-rGO composites and (e) $C_3N_4$-rGO-Ru complexes.

FIG. 12A illustrates XPS survey spectra of (i) $C_3N_4$, (ii) $C_3N_4$-rGO, and (iii) $C_3N_4$-rGO-Ru.

FIG. 12B illustrates high-resolution XPS spectra of C is and Ru 3d.

FIG. 12C illustrates high-resolution XPS spectra of N 1s.

FIGS. 20A, 20B, 20C, and 20D respectively illustrate exemplary XPS spectra of the $C_3N_4$-M nanocomposites (M=$Fe^{3+}$, $Co^{3+}$, $Ni^{3+}$ and $Cu^{2+}$): (A) Fe 2p, (B) Co 2p, (C) Ni 2p and (D) Cu 2p, where the black curves are experimental data and the colored curves are deconvolution fits.

FIG. 22A is an exemplary schematic illustration of the full water splitting cell setup.

FIG. 22B is a photograph of the home-made water splitting setup.

FIG. 22C illustrates exemplary results of water displacement during 20 min of electrochemical operation. Inset is the photograph of water displacement after 20 min.

FIG. 25A illustrates exemplary 1×1 cell structures of $C_3N_4$.

FIG. 25B illustrates exemplary 2×2 cell structures of $C_3N_4$.

FIG. 25C illustrates exemplary 1×1 cell structures of $C_3N_4$—Ru.

FIG. 25D illustrates exemplary 2×2 cell structures of $C_3N_4$—Ru.

FIGS. 26A and 26B respectively illustrate exemplary stable hydrogen adsorption on N and C of $C_3N_4$ after relaxing calculations, where the tops represent topic view and bottoms represent side view.

DETAILED DESCRIPTION

Figure 3A:
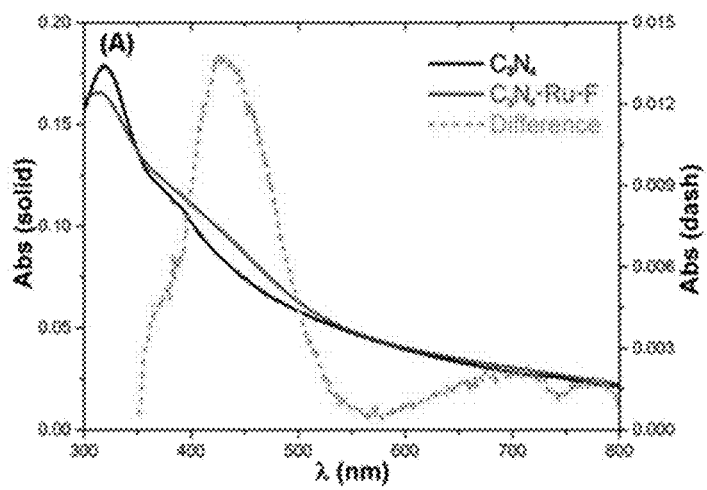
FIG. 3A illustrates an example of ultraviolet (UV)-vis spectra of $C_3N_4$ (black curve), $C_3N_4$—Ru—F (red curve) and the difference between these two spectra (green curve).

In certain implementations, HER electrocatalysts include the thermal refluxing of graphitic $C_3N_4$ nanosheets and $RuCl_3$ in water, leading to the formation of $C_3N_4$—Ru hybrids that exhibit apparent HER activity in acidic media. The HER activity may increase with increased loading of ruthenium ions in the $C_3N_4$ matrix, and in certain examples samples may display an overpotential of only −140 mV to achieve the current density of 10 mA/cm², a Tafel slope of 57 mV/dec, and an exchange current density of 0.072 mA/cm², which is superior to results reported in recent literatures with relevant HER electrocatalysts. This remarkable performance may be attributed to the formation of Ru—$N_2$ moieties that facilitate the adsorption of hydrogen, a critical step in HER catalysis, as confirmed by studies based on DFT calculations. Graphitic $C_3N_4$ nanosheets may be exploited as a unique functional scaffold for the fabrication of a wide range of single atom-like catalysts for diverse applications.

By taking advantage of the abundant pyridinic nitrogen moieties in graphitic carbon nitride ($C_3N_4$) nanosheets, ruthenium ions may be embedded within the $C_3N_4$ molecular skeleton, forming Ru—$N_x$ moieties that may serve as effective active sites for HER, analogous to conventional organometallic complexes. With high chemical/thermal stability, $C_3N_4$ has been explored as advanced metal-free catalysts for a variety of energy conversion/storage processes. For instance, $C_3N_4$-based materials have been used as effective photocatalysts where the electronic band gap structure may be readily manipulated by doping with non-metal elements. However, applications of $C_3N_4$ in electrocatalysis, such as HER, have been limited by the low electrical conductivity. This may be mitigated by the incorporation of metal ions into the $C_3N_4$ molecular skeleton by taking advantage of the tri-s-triazine units of $C_3N_4$ that readily chelate transition metal ions.

Incorporation of ruthenium metal ions into the $C_3N_4$ matrix may be manifested by the emergence of unique metal-ligand charge transfer (MLCT) in UV-vis and photoluminescence (PL) measurements. XPS measurements may suggest electron transfer from the $C_3N_4$ skeleton to the ruthenium metal centers. Remarkably, the $C_3N_4$—Ru nanocomposites can be readily dispersed in water and exhibit apparent HER activity in acid, which increases with increasing loading of the ruthenium metal centers. Saturating a sample with ruthenium complexation at a ruthenium to pyridinic nitrogen ratio of ca. 1:2 may display an optimal performance, e.g., with a low overpotential of only −140 mV to achieve the current density of 10 mA/cm², a Tafel slope of 57 mV/dec, and an exchange current density of 0.072 mA/cm², which is superior to results reported recently with $C_3N_4$-based HER catalysts. This performance might be the result of the formation of Ru—N moieties where the synergistic interactions between pyridinic nitrogen and ruthenium metal centers facilitate the adsorption of protons with a decrease of the Gibbs free energy.

Graphitic $C_3N_4$ nanosheets may be synthesized by thermal treatment of melamine in air. For example, in certain implementations, 10 g of melamine may be placed in a ceramic crucible with a cover and heated to 600° C. at a heating rate of 2.3° C./min. The sample may be heated at this temperature for 3 hours before being cooled down to room temperature, yielding a product that may be ground into a powder. To synthesize ruthenium ion-complexed carbon nitride ($C_3N_4$—Ru), 50 mg of the $C_3N_4$ powder synthesized above may be first dispersed into 50 mL of Nanopure $H_2O$ under sonication overnight to produce $C_3N_4$ thin layers. 56 mg of $RuCl_3$ may be added into the mixture, which may be refluxed for 4 hours. The product may be collected by centrifugation at 4500 rpm for 10 minutes and washed with Nanopure $H_2O$ and ethanol to remove excess ruthenium ions, for example. In this synthesis, the supernatant may show a light brown color, indicating that there is a small excess of ruthenium ions in the solution and $C_3N_4$ is saturated with ruthenium complexation. The corresponding sample may be referred to as $C_3N_4$—Ru—F. Another sample may be prepared in the same manner except the amount of $RuCl_3$ added may be reduced by half to 28 mg. After centrifugation, the supernatant may be colorless, indicating that all ruthenium ions are incorporated into $C_3N_4$. The product may be denoted as $C_3N_4$—Ru—P.

$C_3N_4$ complexed with other transition-metal ions (e.g., $Fe^{3+}$, $Co^{3+}$, $Ni^{3+}$, and $Cu^{2+}$) may also be prepared in a similar fashion where an equivalent amount of salt precursors may be used instead of $RuCl_3$, and the corresponding products may be referred to as $C_3N_4$—Fe, $C_3N_4$—Co, $C_3N_4$—Ni, and $C_3N_4$—Cu. For these samples, the supernatants after centrifugation may show the same colors as those of the original metal salts, suggesting that the metal ions are in excess and $C_3N_4$ is saturated with the respective metal ions.

In certain implementations, transmission electron microscopic (TEM) measurements were performed with a JOEL JEM 2100F microscope, atomic force microscopic (AFM) measurements were carried out with a Molecular Imaging PicoLE SPM instrument, X-ray diffraction (XRD) patterns were acquired with a Rigaku Americas Miniflex Plus powder diffractometer operated at the voltage of 40 kV and current of 30 mA, XPS measurements were carried out with a PHI 5400/XPS instrument equipped with an Al $K_\alpha$ source operated at 350 W and $10^{-9}$ Torr, UV-vis spectra were collected with a Perkin Elmer Lambda 35 UV-vis spectrometer, and PL measurements were performed with a PTI fluorospectrometer. Inductively coupled plasma mass spectrometric (ICP-MS) analysis was carried out with an Agilent 1260-7700e instrument.

In these implementations, electrochemical tests were performed using a CHI710 workstation and electrochemical impedance measurements were carried out with a Gamry Reference 600 instrument. A Ag/AgCl electrode (e.g., saturated KCl) and Pt wire were used as the reference electrode and counter electrode, respectively, while a glassy carbon electrode (5 mm in diameter, 0.196 $cm^2$) was used as the working electrode. The Ag/AgCl electrode was calibrated against a reversible hydrogen electrode (RHE) and all the potentials were referred to this RHE electrode. To prepare catalyst inks, 2 mg of $C_3N_4$-M powders and 3 mg of carbon black were dispersed in 1 mL of a 1:4 (v:v) water/ethanol mixed solvents along with 10 μL of a Nafion solution, and the mixture was sonicated for 30 minutes to achieve good dispersion of the materials. Then 15 μL of the inks was dropcast onto the surface of the glassy carbon electrode and dried at room temperature, corresponding to a mass loading of 0.153 mg/$cm^2$ for the catalysts.

In these implementations, full water splitting was carried out with $C_3N_4$—Ru—F as the HER catalyst and commercial $RuO_2$ as the catalyst for oxygen evolution reaction (OER), along with a Ag/AgCl reference electrode. To prepare the electrodes, the catalysts were dispersed in ethanol at a concentration of 2 mg/mL under sonication for 0.5 h; then 0.5 mL of the catalyst inks was dropcast onto a piece of carbon cloth (1 cm×2 cm) yielding a mass coverage of 0.5 mg/$cm^2$. Water splitting tests were performed with an applied potential of 2 V in 1 M KOH, and the amounts of hydrogen and oxygen generated were quantified by water displacement measurements.

In these implementations, the calculations of the electronic structures of $C_3N_4$ and $C_3N_4$—Ru were carried out by using open-source planewave code, Quantum Espresso. The two-dimensional unit cell was built with two chemical formula of $C_3N_4$ and one Ru atom. The interlayer distance was set at 20 Å so that there was no interaction between the layers. The ultrasoft pseudo-potential was adopted with the wavefunction cutoff of 40 Ry (e.g., charge density cutoff 200 Ry), the energy threshold at $10^{-8}$ Ry, and the force converged to $10^{-4}$ a.u. The Marzari-Vanderbilt smearing was adopted with 0.01 Ry for $C_3N_4$—Ru. The K point was set at 4×4×1. The vibration frequencies of surface species and zero-point energy (ZPE) and entropy contribution were evaluated by density functional perturbation theory (DFPT). All atoms were initiated with spin polarization.

Figure 6:
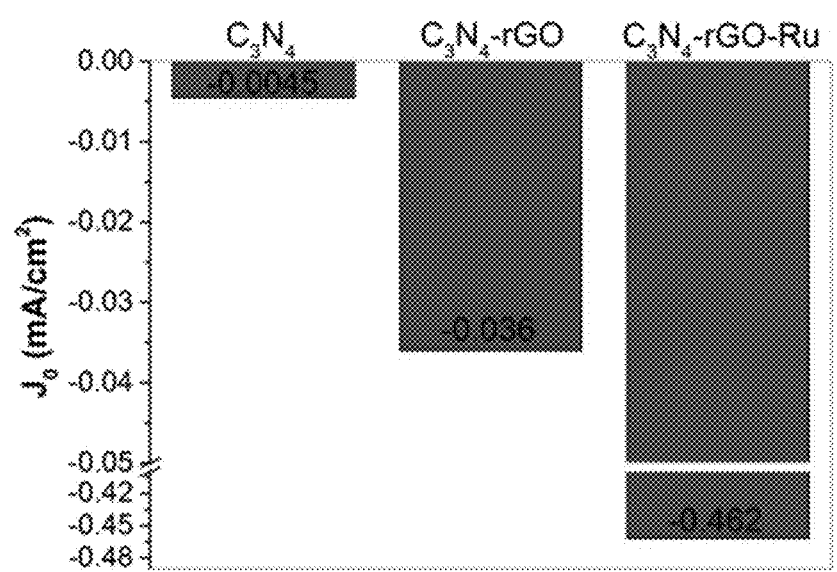
FIG. 6 illustrates an exemplary comparison of exchange current densities of the as-compared electrocatalyst in accordance with certain implementations of the disclosed technology.
Figure 7:
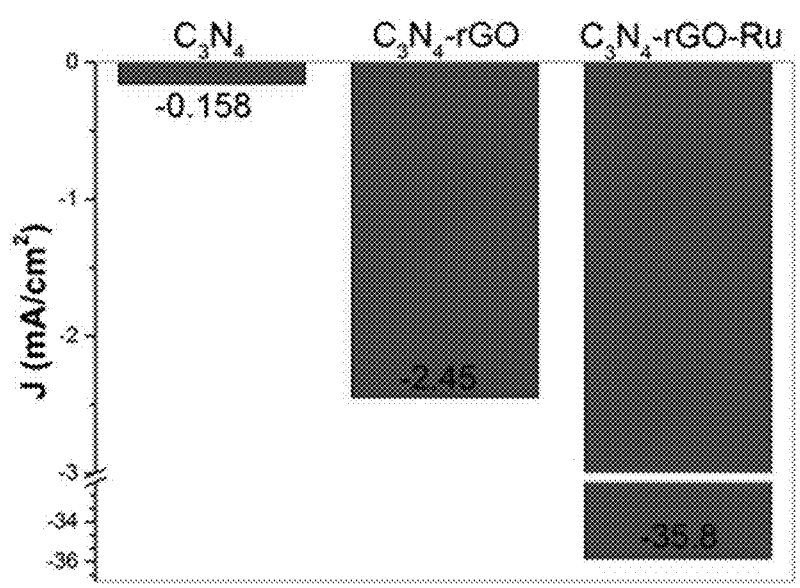
FIG. 7 illustrates an exemplary comparison of current densities of the as-compared electrocatalyst under the overpotential of −150 mV in accordance with certain implementations of the disclosed technology.

In certain implementations, $C_3N_4$ nanosheets were synthesized by thermal treatment of melamine in air, and refluxing with $RuCl_3$ in water led to effective incorporation of ruthenium metal ions into the $C_3N_4$ scaffolds, forming Ru—$N_x$ moieties through the pyridinic nitrogen, as schematically illustrated by FIG. 1A. FIG. 1B depicts a typical TEM image of the $C_3N_4$—Ru—F sample where nanosheet structures of a few tens of nm can be readily identified, which consistent with the as-prepared $C_3N_4$ (see FIG. 6). In XRD measurements (see FIG. 7), both $C_3N_4$—Ru—F and as-prepared $C_3N_4$ nanosheets displayed a single diffraction peak centered at 27.2°, corresponding to an interplanar spacing of 0.326 nm that is characteristic of the $C_3N_4$ (002) planes. Energy dispersive x-ray (EDX) measurements confirmed that Ru ions were incorporated into the $C_3N_4$ matrix, as manifested in the elemental maps of C, N, Ru and Cl in FIGS. 1C-F, which were all distributed rather evenly across the sample.

Figure 8:
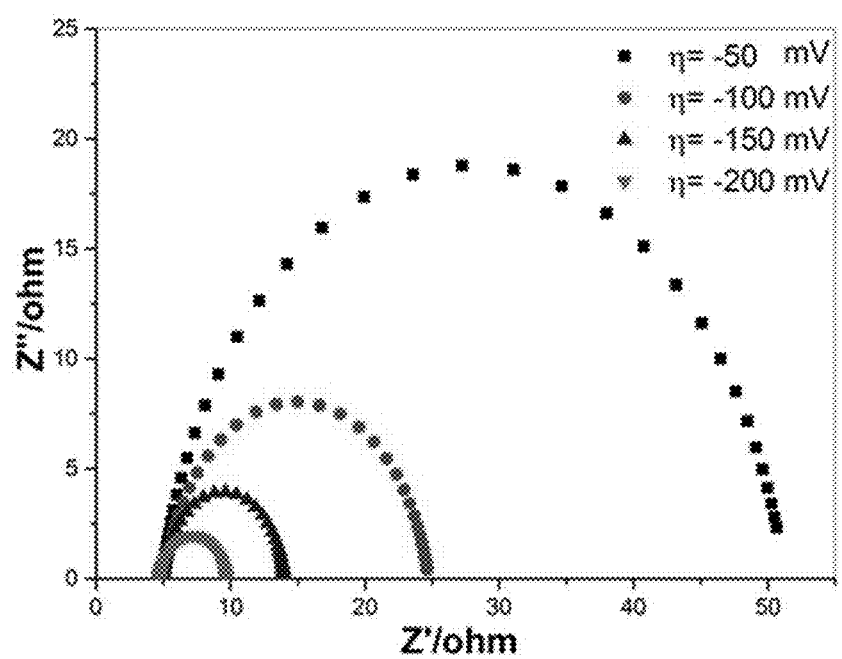
FIG. 8 illustrates exemplary representative Nyquist plots of $C_3N_4$-rGO-Ru complexes at varieties of overpotentials, where the electron transfer resistances are 46.4, 19.7, 9.1 and 5.0Ω at −50, −100, −150 and −200 mV overpotentials, respectively.

A representative AFM topograph is illustrated by FIG. 1G, and the height profile of a line scan is illustrated by FIG. 1H, where the thickness of the $C_3N_4$—Ru nanosheets is generally consistent at ca. 2 nm. Statistical analysis based on more than 100 nanosheets showed that the average thickness was 2.0±0.4 nm, as manifested in the thickness histogram (see FIG. 1I), which is identical to that of the as-produced $C_3N_4$ nanosheets (see FIG. 8).

In these implementations, XPS measurements were then carried out to determine the chemical composition and valence states of the composites. FIG. 2A depicts the survey spectra of (i) $C_3N_4$, (ii) $C_3N_4$—Ru—P and (iii) $C_3N_4$—Ru—F, where the C 1s and N 1s electrons can be readily identified at ca. 285 eV and ca. 399 eV for all samples, and both $C_3N_4$—Ru—F and $C_3N_4$—Ru—P also exhibited two additional peaks at ca. 282 eV and ca. 199 eV, due to Ru 3d and Cl 2p electrons, Respectively. The high-resolution scan of the Cl 2p electrons is illustrated by FIG. 2B, where the binding energy was found to peak at 197.50 (Cl $2p_{3/2}$) and 199.00 eV (Cl $2p_{1/2}$) for $C_3N_4$—Ru—P and 197.70 (Cl $2p_{3/2}$) and 199.20 eV (Cl $2p_{1/2}$) for $C_3N_4$—Ru—F, consistent with those of $Cl^-$ ions in outer-sphere. The C is and Ru 3d spectra are illustrated by FIG. 2C. For the as-prepared $C_3N_4$, the C 1s spectrum can be deconvoluted into two peaks, a major one at 287.31 eV and a minor one 284.06 eV. The former may be assigned to the $sp^2$-hybridized carbon in N—C=N of the $C_3N_4$ matrix, while the latter likely arose from defective carbon in $sp^3$ C—C bonds. Interestingly, the binding energy of C 1s in N—C=N blue-shifted somewhat to 287.57 eV for $C_3N_4$—Ru—P and even further to 287.93 eV for $C_3N_4$—Ru—F, likely due to the binding of (positively charged) ruthenium ions to the nitrogen moiety. For the Ru 3d electrons, the doublet can be resolved at 281.67 eV (Ru $3d_{5/2}$) and 285.77 eV (Ru $3d_{3/2}$) for $C_3N_4$—Ru—P, and slightly lower at 281.30 eV (Ru $3d_{5/2}$) and 285.40 eV (Ru $3d_{3/2}$) for $C_3N_4$—Ru—F. These binding energies are close to those of Ru(II) 3d electrons in ruthenium tris-bipyridine complex, indicating that ruthenium was reduced to +2 from the original +3 charge state likely by hydroxide species, and incorporated into the $C_3N_4$ matrix by Ru—N coordination bonds that enhanced electron-withdrawing of the nitrogen atoms. FIG. 2D illustrates that consistent results can be obtained in the high-resolution scans of the N is electros. For the $C_3N_4$ nanosheets, two peaks were resolved, a major one at 397.80 eV that may be attributed to the sp$^2$-hybridized pyridinic nitrogen (C—N═C) and a minor one at 399.58 eV that can be assigned to the sp$^3$-hybridized tertiary nitrogen (N—(C)$_3$). After ruthenium ion complexation, the C—N═C peak blue-shifted to 398.08 eV for $C_3N_4$—Ru—P and 398.48 eV for $C_3N_4$—Ru—F (whereas the N—(C)$_3$ peak remained almost invariant). These observations suggest charge transfer from the $C_3N_4$ skeleton to the Ru d-orbital. Such MLCT may have significant implication in the electrocatalytic activity.

Figure 9A:
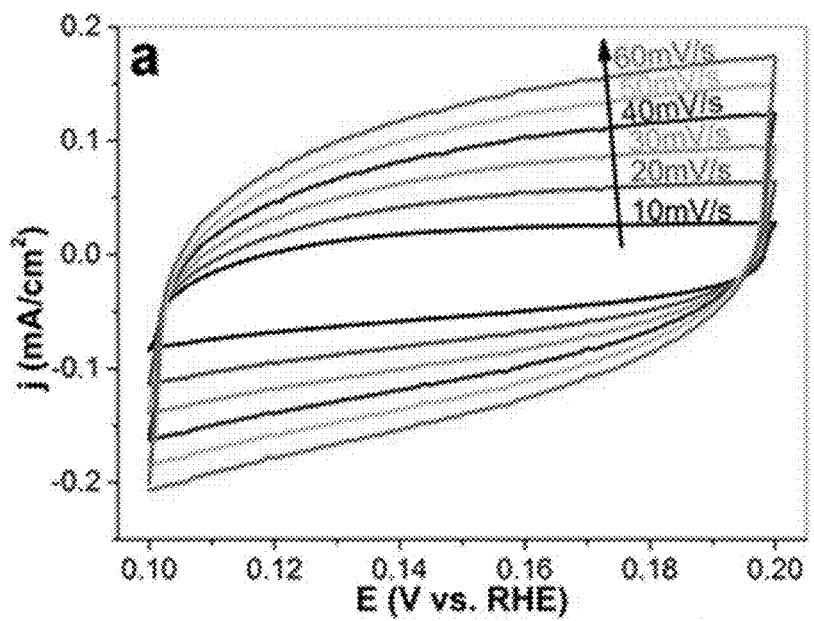
FIG. 9A illustrates exemplary CV curves of $C_3N_4$ within the range of 0.1 V to 0.2 V where no faradaic reaction occurred at different scan rates in accordance with certain implementations of the disclosed technology.
Figure 9B:
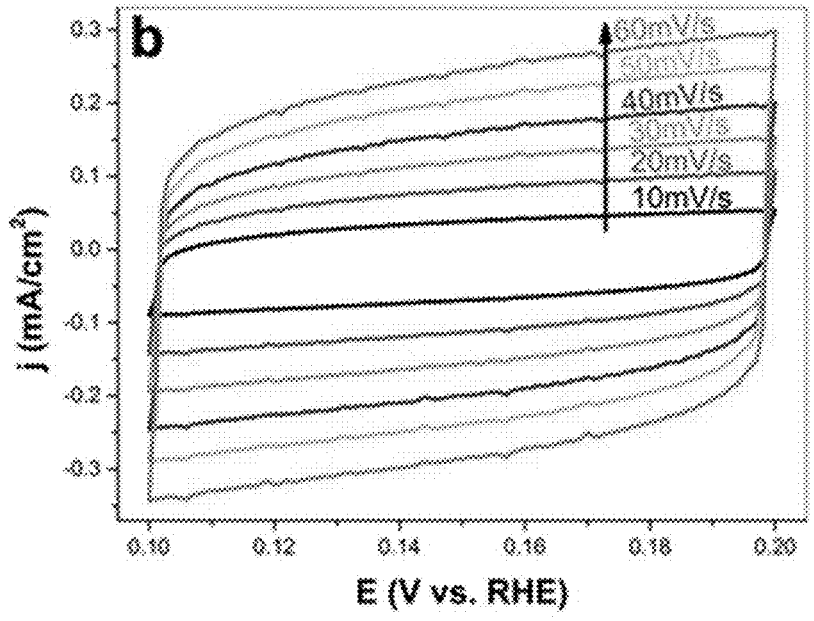
FIG. 9B illustrates exemplary CV curves of $C_3N_4$-rGO within the range of 0.1 V to 0.2 V where no faradaic reaction occurred at different scan rates in accordance with certain implementations of the disclosed technology.

Based on the integrated peak areas, the elemental compositions of the samples in these implementations were then analyzed. First, the atomic ratio of C(N—C═N):N was estimated to be 1:1.27 for $C_3N_4$, 1:1.20 for $C_3N_4$—Ru—P, and 1:1.18 for $C_3N_4$—Ru—F, which is in general agreement with the expected value of 1:1.33. In addition, the Ru to pyridinic N(C═N—C) ratio was estimated to be 1:4.7 for $C_3N_4$—Ru—P and almost doubled to 1:2.0 for $C_3N_4$—Ru—F (see Table 1 below). Consistent results were obtained in ICP-MS measurements where the ruthenium content was found to increase with the amount of RuCl$_3$ added (see FIGS. 9A-B). This suggested that in the saturated structure, each Ru center was coordinated to two pyridinic nitrogen sites, as shown in the schematic diagram of FIG. 1A. In addition, the Ru:Cl ratios in both samples were very close at 1:0.5. The Ru centers were not fully coordinated, which may be advantageous for catalytic reactions.

TABLE 1

Atomic percentages of each elements in the materials based on XPS measurements.

|  | C | N | O | Ru |
|---|---|---|---|---|
| $C_3N_4$ | 42.14% | 53.86% | 4.00% | — |
| $C_3N_4$-rGO | 61.67% | 16.65% | 21.68% | — |
| $C_3N_4$-rGO-Ru | 67.88% | 7.48% | 22.71% | 1.93% |

Further structural insights were obtained in UV-vis and PL measurements in these implementations. FIG. 3A provides that the as-prepared $C_3N_4$ nanosheets (i.e., black curve) exhibited an absorption peak at around 320 nm, which is similar to that observed with graphene quantum dots, and a weak, broad peak at ca. 390 nm which can be assigned to π-π* transitions that are commonly observed in conjugated ring systems including heterocyclic aromatics. Similar optical characteristics can be seen with $C_3N_4$—Ru—F (i.e., red curve). However, the difference between these two spectra shows a new absorption band between 350 nm and 550 nm, where the peak at ca. 431 nm (i.e., green curve) is likely due to MLCT transitions.

Figure 3B:
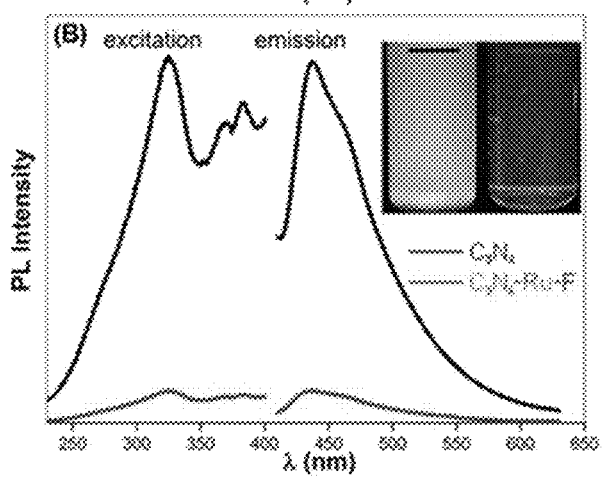
FIG. 3B illustrates an example of photoluminescence spectra of $C_3N_4$ (black curve) and $C_3N_4$—Ru—F (red curve). Inset are the corresponding photographs of $C_3N_4$ and $C_3N_4$—Ru dispersions under 365 nm UV irradiation.

In these implementations, both the $C_3N_4$ and $C_3N_4$—Ru—F exhibited consistent PL profiles, with the emission peak ($\lambda_{em}$) at 436 nm under the excitation ($\lambda_{ex}$) of 330 nm at room temperature (see FIG. 3B). However, the emission intensity of $C_3N_4$—Ru—F decreased by about 91% as compared to that of $C_3N_4$, most likely because the emission coincided with the MLCT absorption of the Ru—N moieties (see panel A) as well as marked diminishment of the $C_3N_4$ bandgap upon ruthenium ion complexation, as suggested in DFT calculations. This is also manifested in the photographs of $C_3N_4$ and $C_3N_4$—Ru—F solutions under photoirradiation at 365 nm (see FIG. 3B inset). The substantial quenching of the PL emission of $C_3N_4$—Ru—F, as compared to $C_3N_4$, suggested that ruthenium ion complexation suppressed radiative recombination of the photo-generated electron-hole pairs.

Figure 4A:
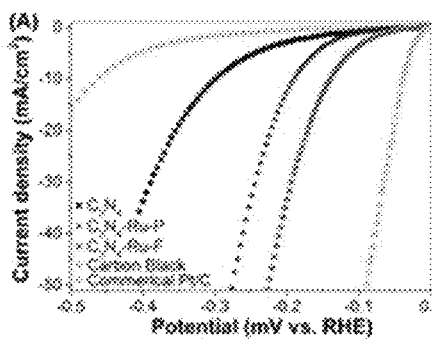
FIG. 4A illustrates an example of polarization curves of HER on various electrocatalysts in 0.5 M $H_2SO_4$.
Figure 19:
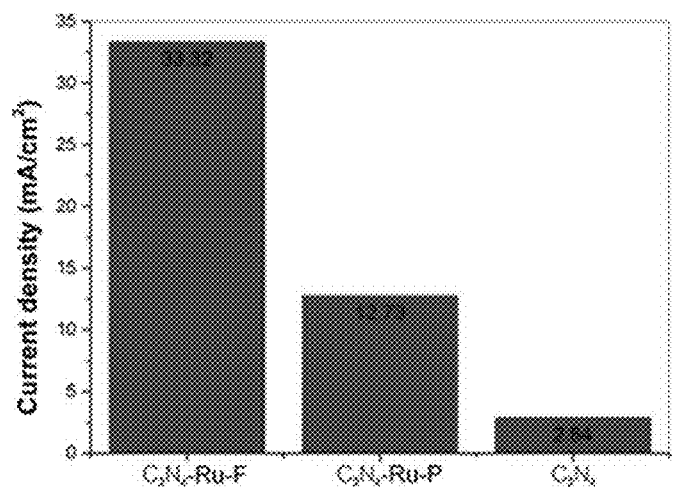
FIG. 19 illustrates exemplary HER current density of $C_3N_4$—Ru—F, $C_3N_4$—Ru—P, and $C_3N_4$ at the overpotential of −200 mV.

The electrocatalytic activities of the samples towards HER were then evaluated by electrochemical measurements in a $N_2$-saturated 0.5 M $H_2SO_4$ solution. FIG. 4A depicts the polarization curves of the various electrocatalysts loaded onto a glassy carbon electrode. The figure illustrates that, at increasingly negative potentials, nonzero currents started to emerge with $C_3N_4$, $C_3N_4$—Ru—P and $C_3N_4$—Ru—F, in comparison to the electrocatalytically inactive carbon black, indicating effective HER activity of the materials. Yet the activity varied markedly among the series. For instance, the overpotential ($\eta_{10}$) required to achieve the current density of 10 mA/cm$^2$ was only −140 mV for $C_3N_4$—Ru—F, which is markedly lower than those for $C_3N_4$—Ru—P (−189 mV) and $C_3N_4$ (−296 mV). For comparison, $\eta_{10}$ for Ru nanoparticles was −233 mV,[63] signifying limited activity of (metallic) ruthenium nanoparticles towards hydrogen evolution. This indicates that it is the incorporation of ruthenium metal ions into the $C_3N_4$ matrix that significantly enhanced the HER activity, which increased with increasing loading of the metal centers (see FIGS. 9A-B). Also, at the same overpotential of −200 mV, the current densities were the highest at 33.32 mA/cm$^2$ for $C_3N_4$—Ru—F, as compared to 12.73 mA/cm$^2$ for $C_3N_4$—Ru—P and 2.84 mA/cm$^2$ for $C_3N_4$ (see FIG. 19). That is, the HER activity of $C_3N_4$—Ru—F is 2.6 times that of $C_3N_4$—Ru—P and 11.7 times that of $C_3N_4$. Notably, whereas the overall performance remains subpar as compared to that of state-of-the art Pt/C (which exhibited $\eta_{10}$ of only −38 mV), it is better than leading results of $C_3N_4$-based HER electrocatalysts reported in recent literature (see Table 2 below, where the first row corresponds to results from the disclosed embodiments and the subsequent rows (labelled a-n) correspond to prior results).

TABLE 2

The HER electrocatalytic performance of the disclosed $C_3N_4$-rGO—Ru complexes with the carbon-based electrocatalysts.

|  | catalyst | $\eta_{10}$ (mV) | Tafel slope (mV/dec) | $J_0$ (µA/cm$^2$) | Loading (mg/cm$^2$) | $C_{dl}$ (mF/cm$^2$) |
|---|---|---|---|---|---|---|
|  |  | −80 | 56 | 462 | 0.153 | 27.8 |
| a | BCN | −70 | 100 | 51 | 0.943 | 0.108 |
| b | PCN/NG | −80 | 49.1 | 430 | 0.57 | N/A |
| c | S,N—C | −116 | 68 | N/A | 0.285 | 27.4 |
| d | Co—C—N | −138 | 55 | N/A | N/A | 400 |
| e | $C_3N_4$—Ru | −140 | 57 | 72 | 0.153 | 18.4 |
| f | N—P—C | −163 | 89 | 160 | 0.159 | N/A |
| g | CN-nrG | −207 | 54 | 39.8 | 0.143 | N/A |
| h | $C_3N_4$@G | −219 | 53 | 49 | 0.142 | 10.6 |
| i | p-WMCNT | −220 | 71.3 | 16 | 0.36 | N/A |
| j | NENU | −237 | 96 | 36 | N/A | N/A |
| k | $C_3N_4$—NG | −240 | 51.5 | 0.35 | 0.1 | 5.0 |
| l | NS-500 | −276 | 81 | 8.4 | N/A | N/A |
| m | $C_3N_4$—CU | −390 | 76 | N/A | 0.28 | N/A |
| n | p-N,P-G | −420 | 91 | 0.24 | 0.204 | 10.6 |

Figure 4B:
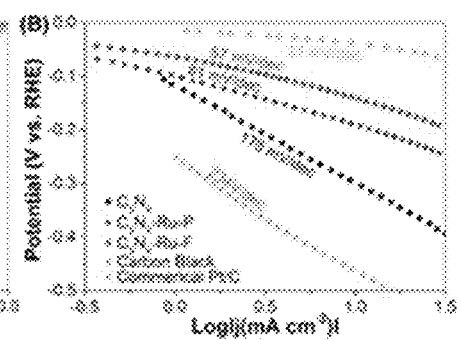
FIG. 4B illustrates an example of corresponding Tafel plots derived from FIG. 4A.

Also in these implementations, the linear portions of the polarization curves (see FIG. 4B) were fitted to the Tafel equation, η=a log |j|+b (where j is the current density, and a is the Tafel slope), and the Tafel slope was estimated to be 57 mV/dec for $C_3N_4$—Ru—F, which is much lower than those for $C_3N_4$—Ru—P (81 mV/dec) and $C_3N_4$ (178 mV/dec). For comparison, the Tafel slope was ca. 31 mV/dec for commercial Pt/C, and markedly greater at 234 mV/dec for the poorly active carbon black.

HER involves the following three reactions, each of which carries a specific Tafel slope:

Volmer reaction (Tafel slope 120 mV/dec):
$$H_3O^+ + e^- \rightarrow H^* + H_2O$$

Heyrovsky reaction (Tafel slope 40 mV/dec):
$$H^* + H_3O^+ + e^- \rightarrow H_2 + H_2O$$

Tafel reaction (Tafel slope 30 mV/dec): $2H^* \rightarrow H_2$ where the asterisks denote surface-adsorbed species. Based on the Tafel slopes obtained above, the rate-determining step (RDS) of HER on Pt/C is most likely the Tafel reaction where molecular hydrogen ($H_2$) is formed by adsorbed hydrogen ($H^*$) and released from the catalyst surface, due to the high activity of platinum in the reduction of proton to atomic hydrogen. For the $C_3N_4$—Ru complexes, the HER activity was likely dictated by the combined Volmer and Heyrovsky reactions, where the RDS involves the formation of metal-hydride moieties. Furthermore, the exchange current density ($J_o$) can be estimated by extrapolation of the Tafel plot to the x axis to be 0.072 mA/cm² for $C_3N_4$—Ru—F, which is also superior to results reported in recent literatures with relevant electrocatalysts (see Table 2 above). For comparison, $J_o$ was markedly lower at 0.014.5 mA/cm² for $C_3N_4$—Ru—P, and 0.00015 mA/cm² for $C_3N_4$, whereas much higher at 1.5 mA/cm² for Pt/C.

Figure 21:
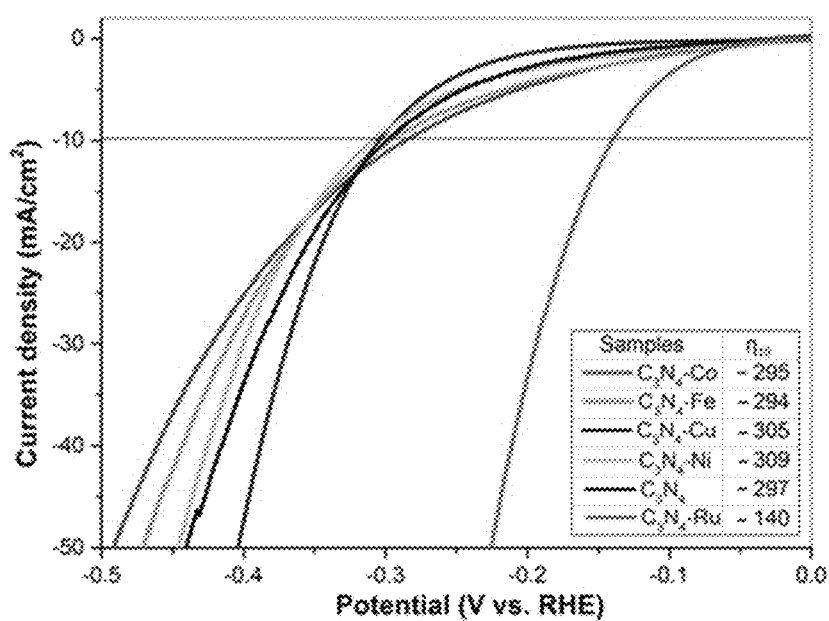
FIG. 21 illustrates exemplary HER performance of the $C_3N_4$-M nanocomposites (M=$Fe^{2+}$, $Co^{2+}$, $Ni^{2+}$ and $Cu^{2+}$). As indicated in the figure legends, the overpotentials ($\eta_{10}$) needed to reach the current density of 10 mA/cm² were all very close to that of $C_3N_4$ alone and much more negative than that of $C_3N_4$—Ru—F.

In these electrochemical measurements, the HER activity of the as-prepared $C_3N_4$ nanosheets alone was very poor, markedly lower than those of the $C_3N_4$—Ru composites. This suggests minimal contributions of pyridinic nitrogen in $C_3N_4$ to hydrogen reduction, in contradiction to results in prior studies where DFT calculations and experimental results suggested that hybrid materials based on carbon nitride and nitrogen-doped graphene might be active for HER electrocatalysis. In the disclosed embodiments, the remarkable HER performance of $C_3N_4$—Ru is attributed to the ruthenium metal centers embedded within the $C_3N_4$ matrix, where the Ru—N moieties behaved analogously to conventional metal complexes for HER. In embodiments where the ruthenium metal centers were replaced by other transition-metal ions, such as Fe(II), Co(II), Ni(II), and Cu(II), the HER performance of the resulting $C_3N_4$-M composites diminished substantially and became comparable to that of $C_3N_4$ alone (see FIGS. 20 and 21), thus confirming that the unique role of ruthenium centers in the electroreduction of protons to hydrogen. The HER activity of $C_3N_4$—Ru—F was also manifested in full water splitting with commercial $RuO_2$ as the OER catalyst, where the amount of hydrogen generated was 2.05 times that of oxygen (see FIGS. 22A-C).

Figure 4C:
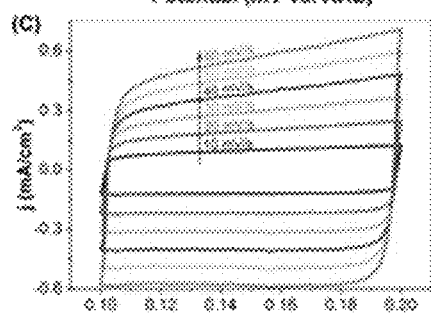
FIG. 4C illustrates exemplary cyclic voltammograms within the range of +0.1 to +0.2 V where no faradaic reaction occurred at difference scan rates.
Figure 4D:
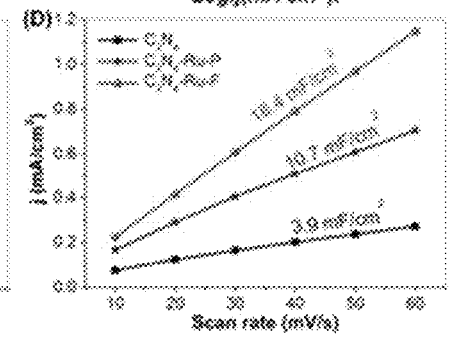
FIG. 4D illustrates an exemplary variation of the double-layer charging currents at +0.15 V versus scan rate.

Further insights into these interactions between ruthenium metal centers and $C_3N_4$ matrix were obtained by quantitative analysis of the electrochemical active surface area (ECSA) and charge-transfer resistance ($R_{ct}$). FIG. 4C illustrates the cyclic voltammograms of $C_3N_4$—Ru—F recorded at different scan rates (10 to 60 mV/s) in the potential range of +0.1 to +0.2 V vs. RHE, where no faradaic reaction occurred. FIG. 4D illustrates that the current density at +0.15 V versus potential scan rate and the double layer capacitance ($C_{dl}$, which is proportional to ECSA) of $C_3N_4$—Ru—F was estimated to be 18.4 mF/cm², which was 4.7 times that of $C_3N_4$ (3.9 mF/cm²), and 1.7 times that of $C_3N_4$—Ru—P (10.7 mF/cm²). This may be attributed to the enhanced electrical conductivity of the composites with the incorporation of metal centers into the $C_3N_4$ molecular skeleton.

Taking into consideration the low mass loading of 0.153 mg/cm² of the composites, the $C_{dl}$ values were also comparable to result reported in prior studies (see Table 2 above).

Figure 4E:
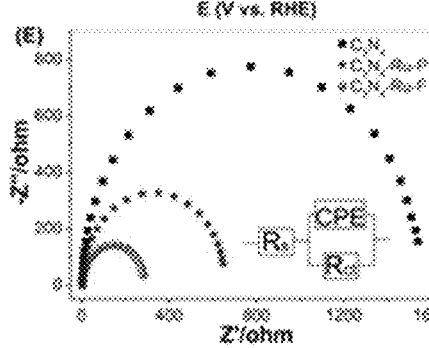
FIG. 4E illustrates an example of Nyquist plots collected at the overpotential of −50 mV. Inset is the equivalent circuit of the electrocatalyst-modified electrode, where $R_s$ is (uncompensated) resistance, $R_{ct}$ is charge-transfer resistance and CPE is constant-phase element (equivalent to $C_{dl}$).
Figure 23:
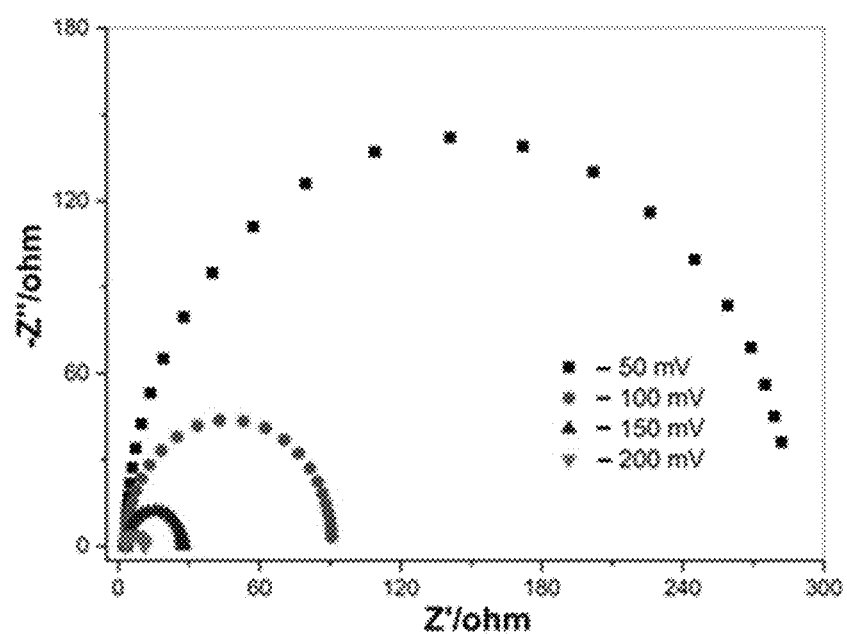
FIG. 23 illustrates exemplary Nyquist plots of HER on $C_3N_4$—Ru—F at different overpotentials (i.e., −50, −100, −150 and −200 mV).

In these implementations, electrochemical impedance measurements were then carried out to quantify the corresponding $R_{ct}$. FIG. 23 depicts the typical Nyquist plots of $C_3N_4$—Ru—F at various overpotentials, and $R_{ct}$ was estimated by fitting the data to Randle's equivalent circuit (see FIG. 4E inset). The figure illustrates that $R_{ct}$ decreased significantly with increasing overpotentials. FIG. 4E compares the Nyquist plots of the various electrocatalysts at the overpotential of −50 mV, where $R_{ct}$ was estimated to be 285Ω for $C_3N_4$—Ru—F, 658Ω for $C_3N_4$—Ru—P and 1550Ω for $C_3N_4$. The figure confirms that the embedding of ruthenium metal centers within the $C_3N_4$ matrix greatly facilitated the electron-transfer kinetics, which is consistent with results from the above voltammetric measurements.

Figure 4F:
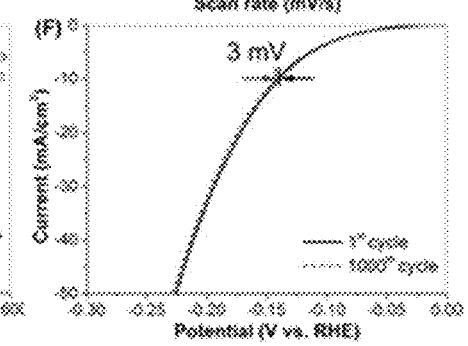
FIG. 4F illustrates an example of the 1' and 1000th cycle of HER polarization curves on $C_3N_4$—Ru—F in a stability test in accordance with certain implementations of the disclosed technology.
Figure 24:
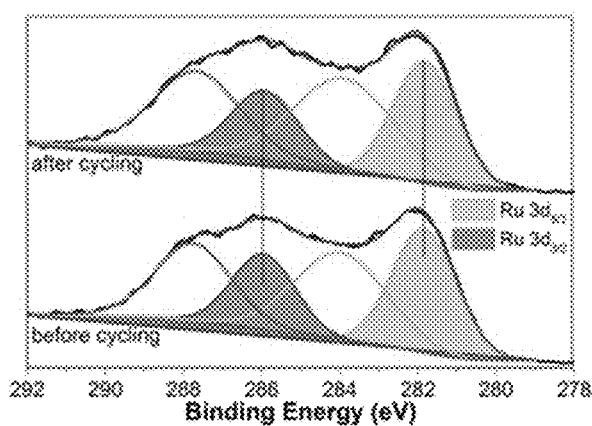
FIG. 24 illustrates exemplary XPS spectra of the C is and Ru 3d electrons in $C_3N_4$—Ru—F before and after 1000 electrochemical cycles.

In addition to excellent electrocatalytic activity, stability of the catalysts is an important variable in practical applications. For $C_3N_4$—Ru—F, the polarization profiles remained almost invariant after 1,000 cycles of potential scans, with the $\eta_{10}$ value increased by only 3 mV, suggesting long-term durability of the catalyst (see FIG. 4F). XPS measurements showed no variation of the C is and Ru 3d electrons after 1,000 electrochemical cycles (see FIG. 24).

Figure 27A:
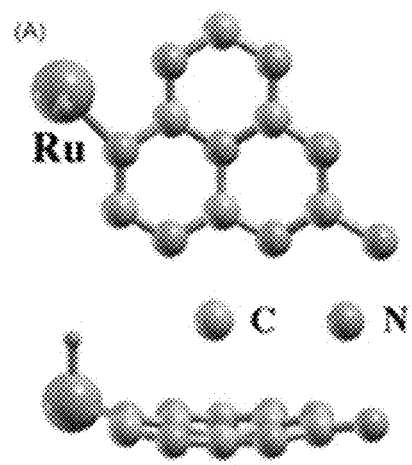
FIGS. 27A, 27B, and 27C respectively illustrate exemplary stable hydrogen adsorption on Ru, N1, and C of $C_3N_4$—Ru after relaxing calculations, where the tops represent topic view and bottoms represent side view.
Figure 27B:
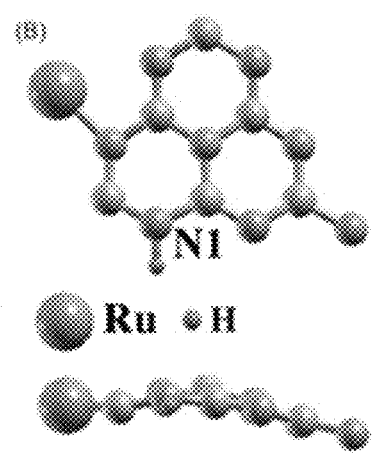
Figure 27C:
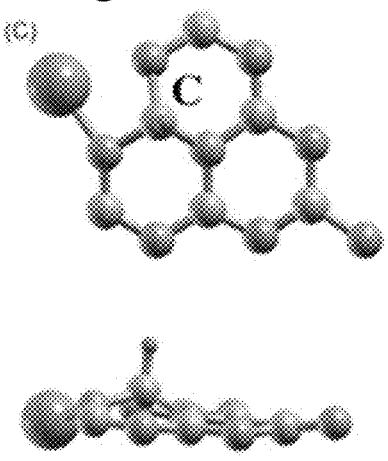

In these implementations, DFT calculations were conducted to examine the effect of the incorporation of ruthenium ions into the $C_3N_4$ matrix on the band structures and Gibbs free energy of hydrogen adsorption and reduction. 2×2 cells of $C_3N_4$ and $C_3N_4$—Ru were used for the calculations (see FIGS. 25-27), where a ruthenium ion was bonded to two nitrogen sites, as suggested by experimental results (see FIG. 2, and Table 1 above). The calculated band structure of $C_3N_4$ (see FIG. 5A) suggests an indirect band gap of about 1.3 eV, which is in general agreement with the PDOS plot in FIG. 5B. In contrast with the semiconducting nature of $C_3N_4$, the band structure of $C_3N_4$—Ru (see FIG. 5C) shows no band gap, which is attributable to the embedding of ruthenium ions into the $C_3N_4$ matrix caused a charge transfer between $C_3N_4$ and ruthenium ions, as observed in XPS measurements (see FIG. 2). Additionally, the PDOS profile of $C_3N_4$—Ru shows a large density of states at the Fermi level, with the primary contributions from the Ru 4d and 5s orbitals (see FIG. 5D). This indicates that the incorporation of ruthenium ions into $C_3N_4$ led to redistribution of the electrons within the composite, crossing of the Fermi level with the conduction band, and hence enhanced charge mobility and electrical conductivity, consistent with electrochemical impedance measurements (see FIG. 4E). This may also explain the quenching of the $C_3N_4$ PL emission (see FIG. 3).

This discrepancy of the electronic structures of $C_3N_4$—Ru, as compared to that of $C_3N_4$, is likely responsible for the enhanced electrocatalytic activity of $C_3N_4$—Ru. HER typically involves a three-state process, an initial $H^+$ state, an intermediate $H^*$ state, and $\frac{1}{2}H_2$ state as the final product (see FIG. 5E), and the Gibbs free-energy of the formation of the intermediate $H^*$ state, $|\Delta G_{H^*}|$, can be used as the descriptor of the HER performance for different electrocatalysts. For an ideal HER electrocatalyst, $|\Delta G_{H^*}|$ should be zero. In the disclosed embodiments, $C_3N_4$ was found to exhibit a Gibbs free energy of $\Delta G^C_{H^*}=+1.23$ eV and $\Delta G^N_{H^*}=-0.63$ eV for the carbon and nitrogen bonding sites (see left inset to FIGS. 5E and 26), respectively. Yet, when ruthenium ions were incorporated into the $C_3N_4$ matrix, the $|\Delta G_{H^*}|$ values were found to be substantially lower at the Ru, C, and N binding sites (see right inset to FIGS. 5E and 27), $\Delta G^C_{H^*}=-0.48$ eV, $\Delta G^{N1}_{H*}=+0.57$ eV, $\Delta G^{N2}_{H*}=+0.60$ eV and $\Delta G^{Ru}_{H*}=-0.49$ eV, suggesting enhanced hydrogen adsorption by ruthenium ion complexation to $C_3N_4$. This is also illustrated by FIG. 5F, which depicts the interfacial charge transfer between $C_3N_4$ and ruthenium ions (e.g., by computing the charge density difference between $C_3N_4$—Ru and $C_3N_4$+ isolated Ru atom) and the resulting charge redistribution among the entire cell. The incorporation of ruthenium ions into the $C_3N_4$ molecular skeleton drastically enhanced the electrical conductivity, and facilitated the adsorption of hydrogen to various binding sites in the composites, which is generally responsible for the enhanced HER performance (see FIGS. 27A-C).

In certain implementations of the disclosed technology, the HER performance is further enhanced by incorporating rGO into the ruthenium ion-complexed carbon nitride nanosheets, forming $C_3N_4$-rGO-Ru complex. The incorporation of Ru ions led to a change of the electronic structure of the material due to charge transfer from $C_3N_4$ to Ru ions, as confirmed by XPS measurements, increase of electrochemical surface area, electric conductivity and charge carrier density, decrease of charge transfer resistance and narrowing of the material bandgap. The results included a dramatic enhancement of the electrocatalytic activity towards HER, with a low $\eta_{10}$ of only −80 mV, a Tafel slope of 55 mV/dec, and exchange current density of 0.462 mA/cm$^2$.

Figure 10:
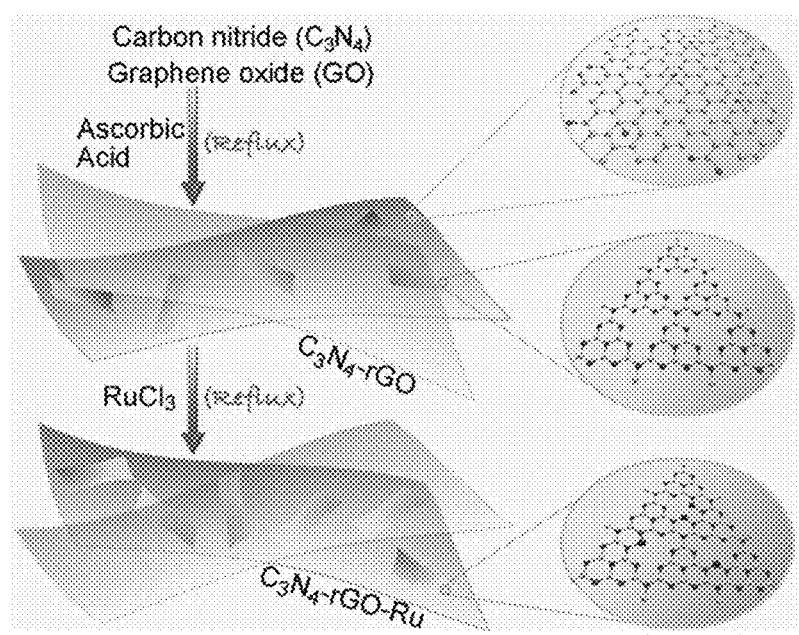
FIG. 10 illustrates an example of synthetic processes of the $C_3N_4$-rGO-Ru complex in accordance with certain implementations of the disclosed technology.

The synthesis of the $C_3N_4$-rGO-Ru complex is schematically illustrated by FIG. 10. In these implementations, GO was reduced by refluxing well-dispersed $C_3N_4$ in aqueous solution with ascorbic acid to form $C_3N_4$-rGO composites. Then a calculated amount of RuCl$_3$ was added into the solution to form $C_3N_4$-rGO-Ru complexes. The formation of the composites was first confirmed by AFM measurements and the results were depicted in FIGS. 11A-C. As illustrated by FIG. 11A($a_1$), the thin-layer $C_3N_4$ is well-dispersed without any aggregation. FIG. 11A($a_2$) exhibits the representative heights of the $C_3N_4$ sheets marked by the line in FIG. 11A($a_1$), and it was found that the average height of the $C_3N_4$ sheets is about 2.0±0.4 nm (FIG. 11A($a_3$)) by counting more than 100 sheets which is consistent with previous study, indicating a 4-7 layers $C_3N_4$ ($C_3N_4$ possesses the layer distance of about 0.33 nm). After the introduction of rGO into $C_3N_4$ sheets, it was found that the products became agglomerations (see FIG. 11B($b_1$)), and the heights at different positions of the marked line are also varied from 2.2, 7.0, 8.4, to 10.3 nm (see FIG. 11B($b_2$)) while the average thickness were about 6.3±3.7 nm counting by more than 100 positions (see FIG. 11B($b_3$)). This indicates that the $C_3N_4$ sheets were assembled onto the rGO and formed a sandwich structure, leading a strong interaction between $C_3N_4$ and rGO because of the interlayer 7C-7C interaction, van der Waals force and hydrogen bonding of oxygen-containing groups. After the incorporation of ruthenium ions, the AFM topograph of the $C_3N_4$-rGO-Ru complexes exhibited similar results (see FIG. 11C($c_1$)) as $C_3N_4$-rGO composites where the heights are varied from 2, 6.2 to 9.5 nm (see FIG. 11C($c_2$)) based on the marked line in FIG. 11C($c_1$) and the thickness distribution is about 7.3±4.0 nm counting by more than 100 positions (see FIG. 11C($c_3$)). This suggested that the incorporation of ruthenium ions into the $C_3N_4$ matrix has no effect on the morphology of the materials (though it may have significant effect on the electronic structure). FIGS. 11D-E respectively depict the TEM images of $C_3N_4$-rGO composites and $C_3N_4$-rGO-Ru complexes and their corresponding elemental maps. The similar agglomeration structures of $C_3N_4$-rGO composites and $C_3N_4$-rGO-Ru complexes were observed and all the elements were well distributed, while the Ru was not detected in $C_3N_4$-rGO composites which was presented in $C_3N_4$-rGO-Ru complexes.

To further confirm the existence of these elements and study their valance states, X-ray photoelectron spectroscopic (XPS) measurements were carried out in these implementations and the results are illustrated by FIGS. 12A-C, and Table 3 below.

TABLE 3

Atomic percentages of each elements in the materials based on XPS measurements.

| | C | N | O | Ru |
|---|---|---|---|---|
| $C_3N_4$ | 42.14% | 53.86% | 4.00% | — |
| $C_3N_4$-rGO | 61.67% | 16.65% | 21.68% | — |
| $C_3N_4$-rGO-Ru | 67.88% | 7.48% | 22.71% | 1.93% |

As illustrated by the full spectra in FIG. 12A, the peaks at 284, 399, and 531 eV may be assigned to the C 1s, N is and O 1s, respectively, suggesting the existence of these elements in $C_3N_4$, $C_3N_4$-rGO, and $C_3N_4$-rGO-Ru. In addition, the peak at 464 eV, which is absent in the first two samples, can be ascribed to Ru 3p electrons, while the Ru 3d peaks were overlapped with C1s. Based on integrated peak areas, the contents of each element in $C_3N_4$-rGO-Ru samples were estimated to be 67.88% for C, 7.48% for N, 22.75% for 0 and 1.93% for Ru. In these implementations, high-resolution XPS spectra in the range of Ru 3d, C is (see FIG. 12B) and N 1s (see FIG. 12C) were compared. Two apparent peaks at 281.96 and 286.16 eV were deconvoluted, which were attributed to Ru $3d_{5/2}$ and Ru $3d_{3/2}$ of Ru(II)—N moieties embedded in N-GQD or $C_3N_4$. As for the carbon signals, $C_3N_4$ shows a major peak centered at 287.4 eV due to the sp2-hybridized carbon moieties (N—C=N) embedded in $C_3N_4$ matrix as well as a minor one at 284.2 eV from defective carbon. F or $C_3N_4$-rGO and $C_3N_4$-rGO-Ru, the N—C=N peak positively shifted to 287.85 and 288.02 eV, respectively, indicating reduced electron density due to the charge delocalization from $C_3N_4$ to rGO and/or Ru complex centers. In addition, there were two new peaks at 284.31 eV and 286.16 eV for both $C_3N_4$-rGO and $C_3N_4$-rGO-Ru due to C=C and C—O bonds of rGO, respectively. They are relatively smaller than rGO where C=C at 284.6 eV and C—O at 286.5 eV, suggesting an increase of electron density. Similarly, the N signals can be fitted by two peaks, where the one at 397.86 eV is from sp$^2$-hybridized pyridinic nitrogen moieties (C—N=C) and the other one at 399.62 eV from sp$^3$-hybridized tertiary nitrogen moieties (N—(C)$_3$). In comparison with $C_3N_4$, there was an apparent positive shift for both $C_3N_4$-rGO and $C_3N_4$-rGO-Ru. For instance, the C—N=C signal of $C_3N_4$ was located at 397.86 eV, which shifted to 398.47 eV and 398.65 eV for $C_3N_4$-rGO and $C_3N_4$-rGO-Ru, respectively. The positive shifts may be attributed to the efficient charge transfer from $C_3N_4$ to rGO and/or Ru centers. For the $C_3N_4$-rGO-Ru sample, the atomic ratio of C—N=C to Ru is about 2.3, suggesting that the Ru centers are coordinated by about 2 C—N=C sites. Overall, the XPS measurement reflected the strong interaction among each part of $C_3N_4$-rGO-Ru and resulted in the electron redistribution, which may have an advantageously positive impact on the electrocatalytic performance of the materials.

Figure 13A:
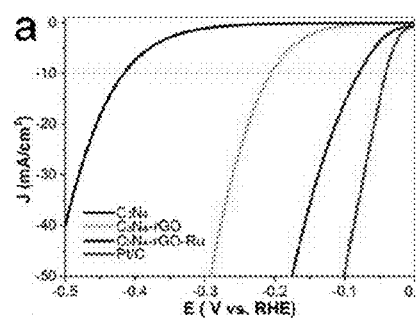
FIG. 13A illustrates exemplary polarization curves of HER on various electrocatalysts in 0.5 M $H_2SO_4$.
Figure 13B:
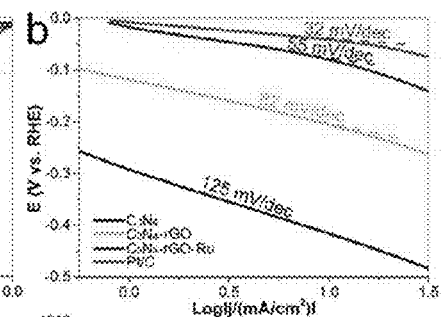
FIG. 13B illustrates corresponding Tafel plots derived from panel (a).
Figure 13C:
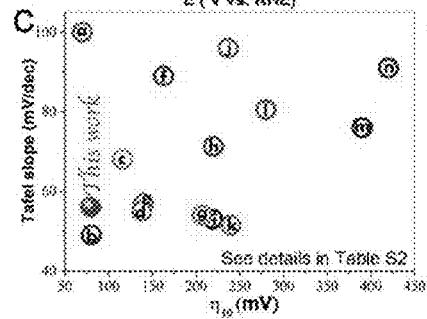
FIG. 13C illustrates an exemplary comparison of the HER performance of the disclosed electrocatalyst to prior carbon based electrocatalysts.
Figure 14:
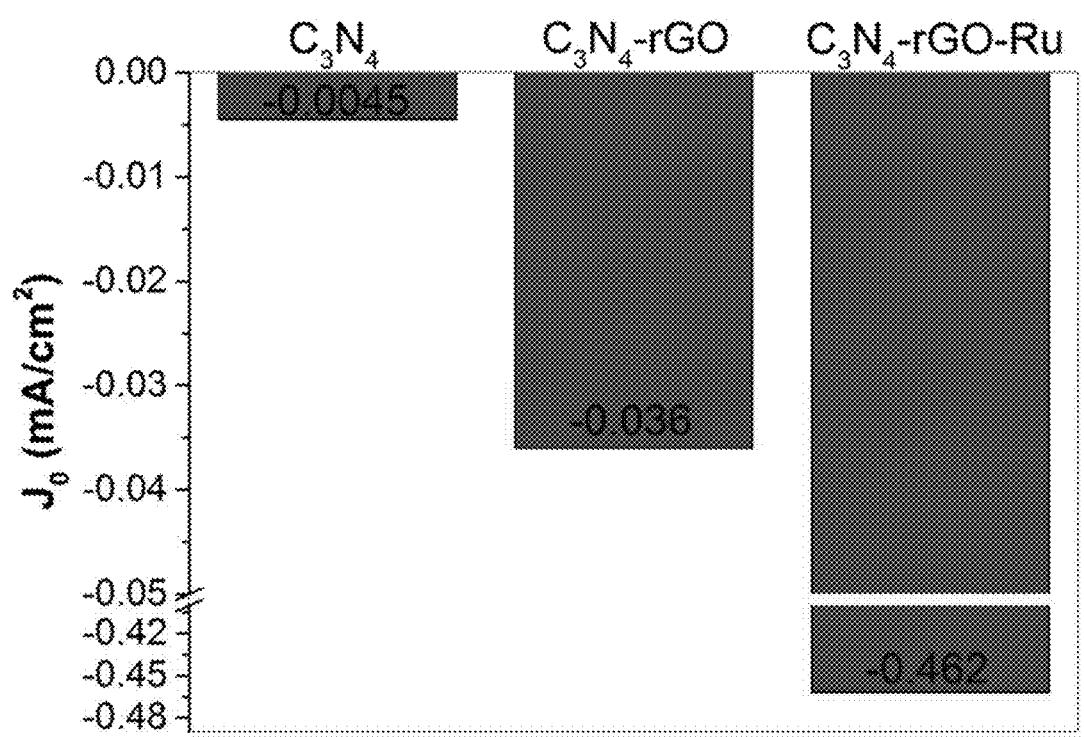
FIG. 14 illustrates an exemplary comparison of exchange current densities of the as-compared electrocatalyst in accordance with certain implementations of the disclosed technology.
Figure 15:
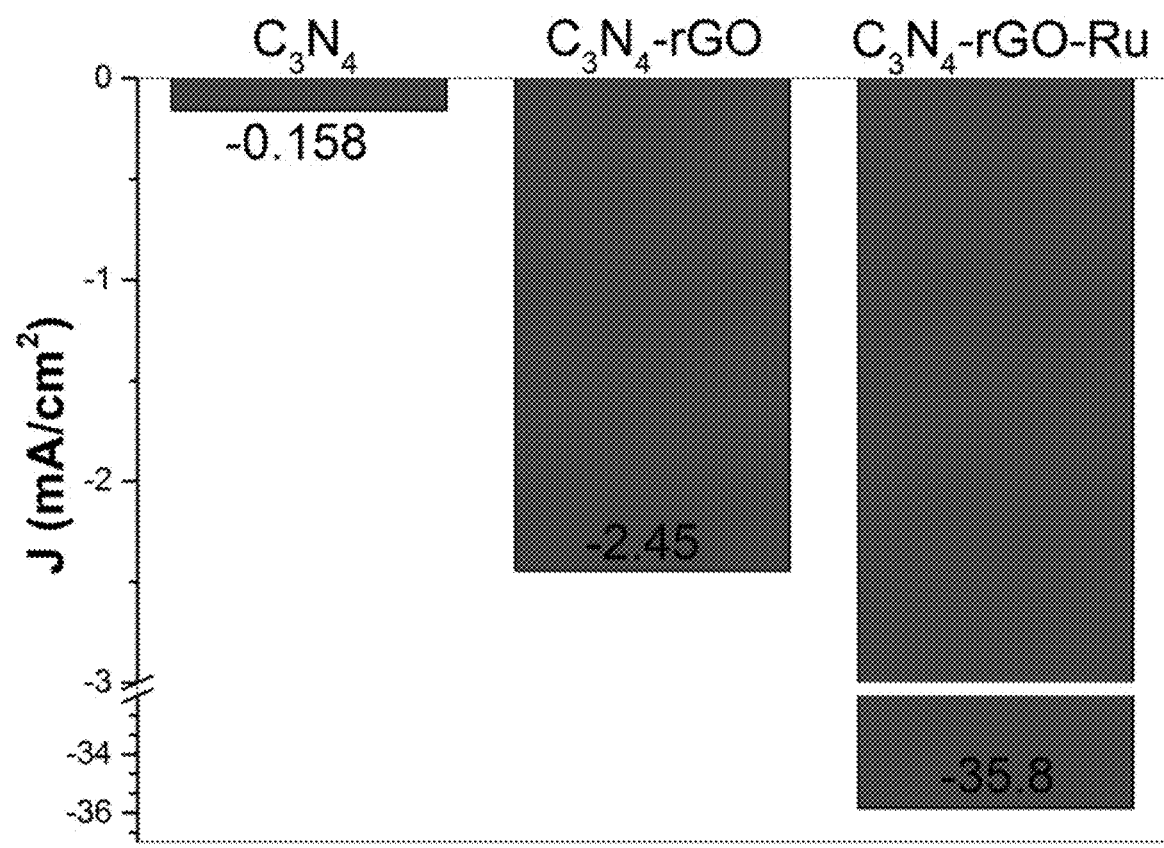
FIG. 15 illustrates an exemplary comparison of current densities of the as-compared electrocatalyst under the overpotential of −150 mV in accordance with certain implementations of the disclosed technology.

In these implementations, the electrocatalytic activities towards HER were compared by electrochemical measurements in N$_2$-saturated 0.5 M H$_2$SO$_4$ electrolyte. FIG. 13A illustrates the typical polarization curves of the various electrocatalysts loaded onto a glassy carbon electrode, from which $\eta_{10}$ was estimated to be −416, −206, −80, and −41 mV for $C_3N_4$, $C_3N_4$-rGO, $C_3N_4$-rGO-Ru, and Pt/C respectively. Correspondingly, the Tafel plots of these electrocatalysts were derived from polarization curves. As illustrated by FIG. 13B, the Tafel slope was 125, 82, 55, and 32 mV/dec for $C_3N_4$, $C_3N_4$-rGO, $C_3N_4$-rGO-Ru, and Pt/C, respectively. FIG. 14 further depicts the exchange current densities ($J_0$) of various catalysts and $J_0$ of $C_3N_4$-rGO-Ru is 0.462 mA/cm$^2$, which is very close to that of Pt/C ($J_0$=0.576 mA/cm$^2$) and is 12.8 times that of $C_3N_4$-rGO ($J_0$=0.036 mA/cm$^2$) and 103 times that of $C_3N_4$ ($J_0$=0.0045 mA/cm$^2$). Whereas the state-of-the-art Pt catalyst possessed the best HER performance, the $C_3N_4$-rGO-Ru composite displayed the second best electrocatalytic activity towards HER. The Tafel slope between 40 and 120 mV/dec also signified the rate-determining step of hydrogen evolution on the catalysts is Volmer-Heyrovsky reaction. Furthermore, the $C_3N_4$-rGO-Ru showed a large cathodic current density of 35.83 mA/cm$^2$ which was 14.6 times that of $C_3N_4$-rGO (2.45 mA/cm$^2$) and 227 times of $C_3N_4$ (0.158 mA/cm$^2$) at the overpotential of −150 mV (see FIG. 15). This suggests that the HER performance was dramatically enhanced with the introduction of rGO and Ru ions into the composites. FIG. 13C and Table 4 below compared the $\eta_{10}$ and Tafel slope of several carbon-based HER electrocatalysts reported in recently years. The disclosed $C_3N_4$-rGO-Ru composite is generally superior to these examples.

TABLE 4

The HER electrocatalytic performance of the disclosed $C_3N_4$-rGO—Ru complexes (first row) with prior carbon-based electrocatalysts (subsequent rows labelled a-n).

| | catalyst | $\eta_{10}$ (mV) | Tafel slope (mV/dec) | $J_0$ (μA/cm$^2$) | Loading (mg/cm$^2$) | $C_{dl}$ (mF/cm$^2$) |
|---|---|---|---|---|---|---|
| | | −80 | 56 | 462 | 0.153 | 27.8 |
| a | BCN | −70 | 100 | 51 | 0.943 | 0.108 |
| b | PCN/NG | −80 | 49.1 | 430 | 0.57 | N/A |
| c | S,N—C | −116 | 68 | N/A | 0.285 | 27.4 |
| d | Co—C—N | −138 | 55 | N/A | N/A | 400 |
| e | $C_3N_4$—RU | −140 | 57 | 72 | 0.153 | 18.4 |
| f | N—P—C | −163 | 89 | 160 | 0.159 | N/A |
| g | CN-nrG | −207 | 54 | 39.8 | 0.143 | N/A |
| h | $C_3N_4$@G | −219 | 53 | 49 | 0.142 | 10.6 |
| i | p-WMCNT | −220 | 71.3 | 16 | 0.36 | N/A |
| j | NENU | −237 | 96 | 36 | N/A | N/A |
| k | $C_3N_4$—NG | −240 | 51.5 | 0.35 | 0.1 | 5.0 |
| l | NS-500 | −276 | 81 | 8.4 | N/A | N/A |
| m | $C_3N_4$—CU | −390 | 76 | N/A | 0.28 | N/A |
| n | p-N,P-G | −420 | 91 | 0.24 | 0.204 | 10.6 |

Figure 13D:
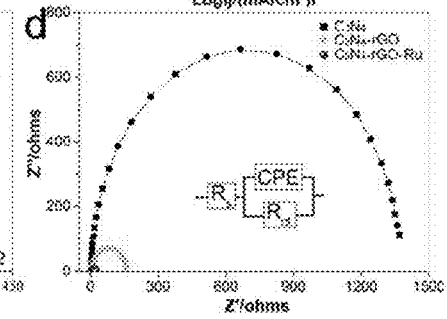
FIG. 13D illustrates exemplary Nyquist plots collected at the overpotential of −100 mV. Inset is the equivalent circuit of the electrocatalyst-coated electrode, where $R_s$ is uncompensated resistance, $R_{ct}$ is charge transfer resistance and CPE is constant-phase element (e.g., equivalent to $C_{dl}$).
Figure 16:
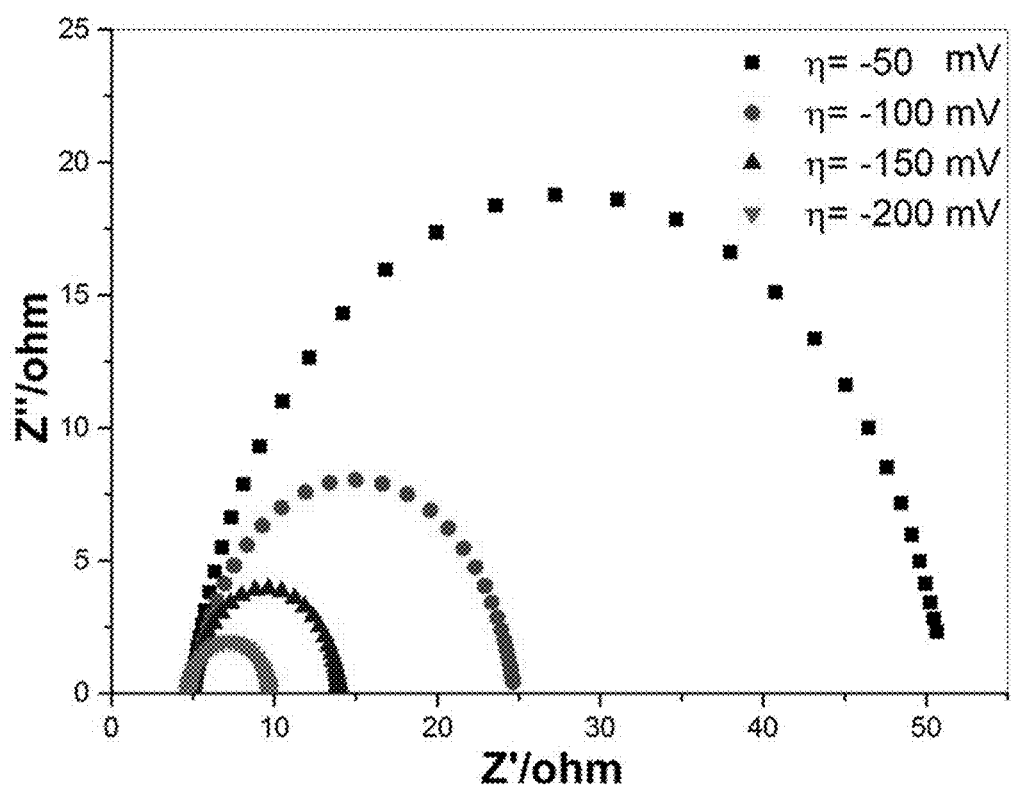
FIG. 16 illustrates representative Nyquist plots of $C_3N_4$-rGO-Ru complexes at varieties of overpotentials. In the example, the electron transfer resistances are 46.4, 19.7, 9.1 and 5.0Ω at −50, −100, −150 and −200 mV overpotentials, respectively.

In these implementations, electrochemical impedance measurements were carried out to quantify the corresponding charge-transfer resistance ($R_{ct}$). FIG. 16 illustrates the representative Nyquist plots of $C_3N_4$-rGO-Ru complexes at various overpotentials and $R_{ct}$ decreased significantly with the increase of overpotentials. FIG. 13D compares the Nyquist plots of the catalysts at the overpotential of −100 mV. By fitting the data to Randle's equivalent circuit (see inset to FIG. 13D), $R_{ct}$ was estimated to be 1366, 157, and 20Ω for $C_3N_4$, $C_3N_4$-rGO, and $C_3N_4$-rGO-Ru. $C_3N_4$ is a semiconducting material and the introduction of rGO can obviously reduce $R_{ct}$. In embodiments where Ru ions were coordinated into $C_3N_4$-rGO, the $R_{ct}$ of the $C_3N_4$-rGO-Ru was further reduced, signifying that the coordination of Ru centers within the composite can efficiently facilitate the electron-transfer kinetics and thus reducing the overpotential of HER.

Figure 17A:
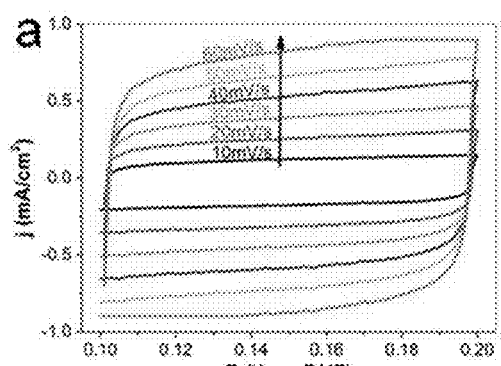
FIG. 17A illustrates exemplary cyclic voltammograms within the range of 0.1 V to 0.2 V where no faradaic reaction occurred at different scan rates.
Figure 17B:
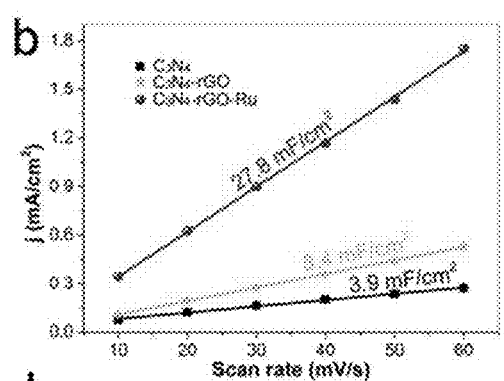
FIG. 17B illustrates variation of the double-layer charging currents at 0.15 V versus scan rate.
Figure 17C:
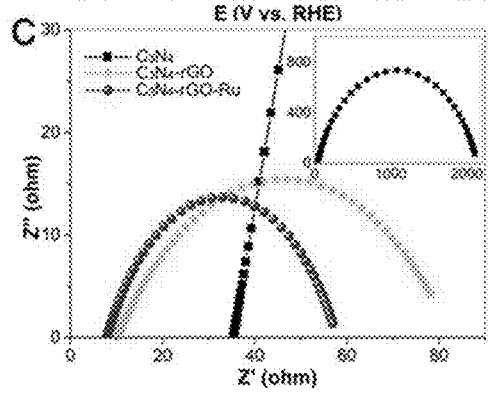
FIG. 17C illustrates exemplary Nyquist plots of electrocatalysts without carbon black collected in 0.5 M $H_2SO_4$ electrolyte at the overpotentials of −100 mV. Inset is the full plot of $C_3N_4$.
Figure 17D:
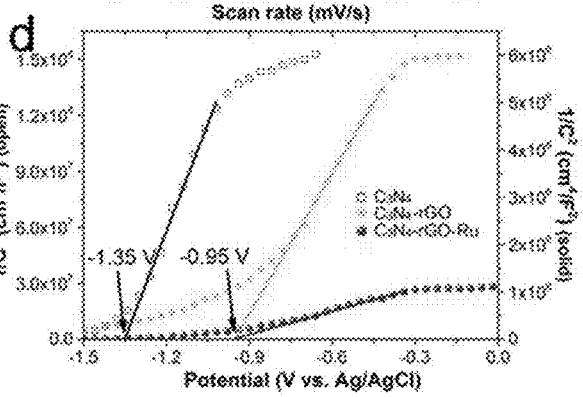
FIG. 17D illustrates exemplary Mott-Schottky plots of electrocatalysts collected in 0.1 M $Na_2SO_4$ electrolyte at a frequency of 1000 Hz. In the example, the potential is versus Ag/AgCl reference electrode.
Figure 18A:
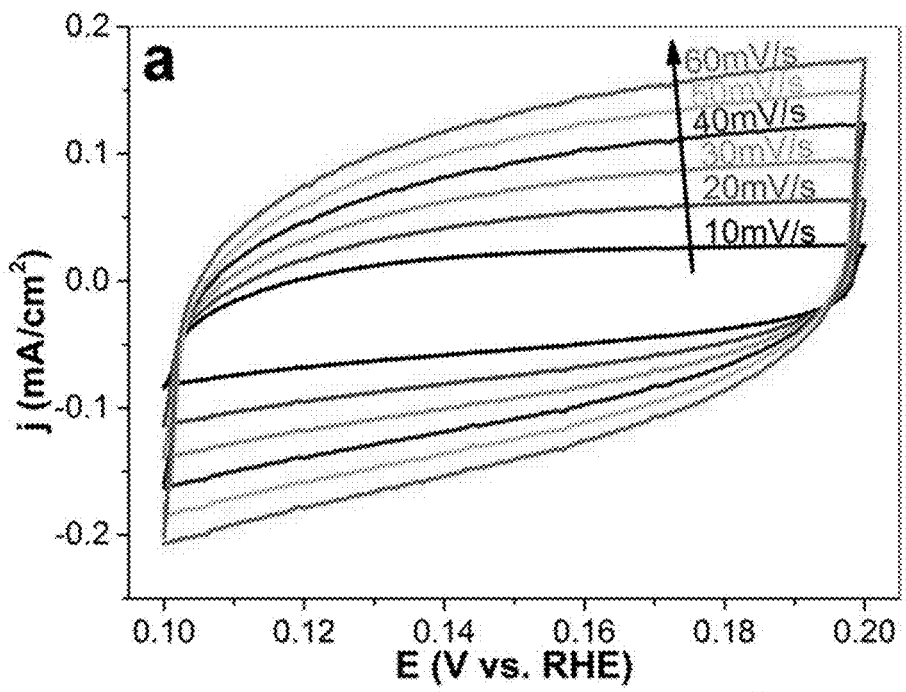
FIGS. 18A and 18B respectively illustrate exemplary CV curves of (a) $C_3N_4$ and (b) $C_3N_4$-rGO within the range of 0.1 V to 0.2 V where no faradaic reaction occurred at different scan rates.
Figure 18B:
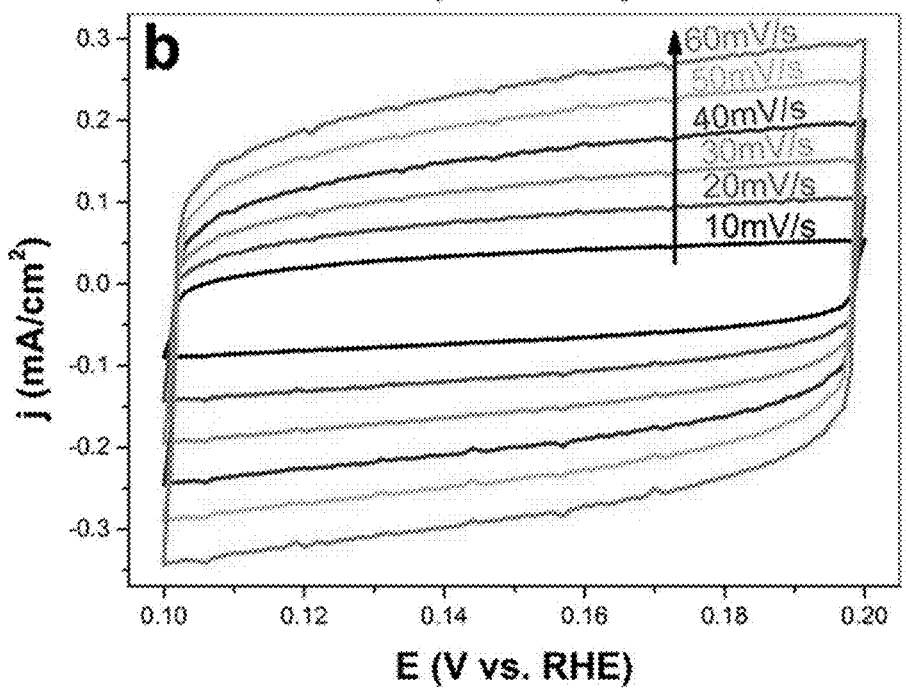

Another factor that may affect the HER performance is the number of active sites. In $C_3N_4$—Ru, it was found that the electron redistribution caused by the coordination of Ru can facilitate the adsorption of hydrogen and provide more active sites. In the disclosed embodiments, the active sites of various electrocatalysts were compared by their electrochemical double-layer capacitance ($C_{dl}$) as it is proportional to effective surface area. FIG. 17A illustrates the representative CV curves of $C_3N_4$-rGO-Ru composite (the CV curves of $C_3N_4$ and $C_3N_4$-rGO are illustrated by FIGS. 18A-B) collected at the scan rates of 10 to 60 mV/s in the non-faradaic reaction range. As illustrated by FIG. 17B, the $C_{dl}$ of $C_3N_4$-rGO-Ru was estimated to be 27.8 mF/cm$^2$, which is about 7.1 times that of $C_3N_4$ (3.9 mF/cm$^2$) and 3.3 times that of $C_3N_4$-rGO (8.4 mF/cm$^2$). This is consistent with the HER performance that the $C_3N_4$-rGO-Ru possessed the best activity among the series. This dramatic enhancement may be attributed to the enhanced electrical conductivity of the composite with the incorporation of rGO and/or Ru centers in to $C_3N_4$. To reveal the electrical conductivity of the materials, the Nyquist plots (see FIG. 17C) were collected again without the addition of carbon black into the ink. There is an apparent $R_s$ of 35.4Ω for $C_3N_4$, while it reduced to 10.0Ω when rGO was introduced and further reduced to 7.9 Ω when formed a $C_3N_4$-rGO-Ru composite. This confirmed that the enhancement of HER performance is accounted for the enhanced electrical conductivity. A Mott-Schottky analysis was performed and the Mott-Schottky plots of various materials are shown in FIG. 17D. The Mott-Schottky plots exhibited a positive slope, indicating n-type characteristic nature of these $C_3N_4$-based materials. Additionally, the flat-band potential ($E_{fb}$) of $C_3N_4$ was derived to be −1.35 V (vs. Ag/AgCl), while the other two anodic shifted to −0.95 V. Thermodynamically, $E_{fb}$ of a n-type semiconductor determines the conduction band position, and the positive shift of the conduction band narrows the energy barrier of hydrogen evolution ($H^+$/$H_2$ −0.59 V vs. Ag/AgCl at 0.1 M $Na_2SO_4$) and thus enhances the electrocatalytic performance of the material. Furthermore, the charge carrier densities of the materials can be calculated by the following equation: $N_d=2/e\varepsilon\varepsilon_0 m$, where $N_d$ is the charge carrier density, e is the elementary charge of an electron, ε is the dielectric constant (≈10 in the present study), $\varepsilon_0$ is permittivity in vacuum (8.85×10$^{-12}$ F/m), and m is the slope of the Mott-Schottky plot. The charge carrier densities were evaluated to be 3.67×10$^{15}$, 1.42×10$^{17}$, and 9.05×10$^{17}$ cm$^{-3}$, for $C_3N_4$, $C_3N_4$-rGO, and $C_3N_4$-rGO-Ru, respectively, suggesting that the charge carrier density of the $C_3N_4$-rGO-Ru is 247 times of that $C_3N_4$ and 6.4 times of that $C_3N_4$-rGO. The Mott-Schottky analysis is highly consistent with the EIS measurement of the electrocatalytic performance.

The introduction of ruthenium ions into the composites of $C_3N_4$-rGO to form $C_3N_4$-rGO complexes by the strong coordination reaction between ruthenium ions and carbon nitride. The disclosed implementations exhibited an enhanced electrocatalytic activity towards hydrogen evolution reaction, which possessed an overpotential of −80 mV for a 10 mA/cm$^2$ current density, Tafel slope 55 mV/dec, exchange current density 0.462 mA/cm$^2$. This significant enhancement is attributed to electron redistribution after the introduction of rGO into $C_3N_4$ and the incorporation of Ru ions. These implementations resulted in efficient narrowing of bandgap of the materials, enhancement of the electric conductivity and charge carrier density, increase of active sites, and reduction of the charge transfer resistance.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

Consequently, in view of the wide variety of permutations to the embodiments that are described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A material including $C_3N_4$-rGO-Ru complexes produced by a method comprising:
   incorporating graphene oxide (GO) in a solution;
   reducing the graphene oxide (GO) by refluxing carbon nitride ($C_3N_4$) in the solution to form carbon-nitride refluxed-graphene-oxide ($C_3N_4$-rGO) composites; and
   incorporating ruthenium ions into the $C_3N_4$-rGO composites to form the $C_3N_4$-rGO-Ru complexes.

2. The material of claim 1, wherein the method further comprises using the $C_3N_4$-rGO-Ru complexes as a catalyst in a hydrogen evolution reaction (HER) process.

3. The material of claim 1, wherein the method further comprises assembling $C_3N_4$ sheets onto the refluxed GO to form a sandwich structure.

4. The material of claim 1, wherein the reducing includes using ascorbic acid in the solution.

5. The material of claim 1, wherein the incorporating includes refluxing ruthenium chloride ($RuCl_3$) in the solution.

6. The material of claim 1, wherein the method further comprises confirming the formed $C_3N_4$-rGO composites by atomic force microscope (AFM) measurements.

7. The material of claim 1, wherein the method further comprises performing x-ray photoelectron spectroscopic (XPS) measurements on the $C_3N_4$-rGO-Ru complexes.

8. The material of claim 1, wherein the method further comprises performing transmission electron microscopy (TEM) on the $C_3N_4$-rGO-Ru complexes.

9. The material of claim 1, wherein the solution is an aqueous solution.

10. The material of claim 9, wherein the aqueous solution is water.

* * * * *